United States Patent
Shimura

(10) Patent No.: US 8,208,027 B2
(45) Date of Patent: Jun. 26, 2012

(54) IMAGE SHOOTING DEVICE AND METHOD FOR SHOOTING IMAGE

(75) Inventor: Atsushi Shimura, Obu (JP)

(73) Assignee: DENSO CORPORATION, Kariya (JP)

( * ) Notice: Subject to any disclaimer, the term of this patent is extended or adjusted under 35 U.S.C. 154(b) by 429 days.

(21) Appl. No.: 12/612,220

(22) Filed: Nov. 4, 2009

(65) Prior Publication Data

US 2010/0123781 A1 May 20, 2010

(30) Foreign Application Priority Data

Nov. 17, 2008 (JP) .................... 2008-293329

(51) Int. Cl.
*H04N 5/33* (2006.01)
(52) U.S. Cl. ...................................... 348/164
(58) Field of Classification Search .......... 348/164, 348/E5.031, E5.09, 222.1; 382/117; 250/208.1
See application file for complete search history.

(56) References Cited

U.S. PATENT DOCUMENTS

| | | | |
|---|---|---|---|
| 2005/0105778 A1* | 5/2005 | Sung et al. | 382/115 |
| 2006/0087582 A1* | 4/2006 | Scharenbroch et al. | 348/370 |
| 2008/0089559 A1* | 4/2008 | Koumura | 382/117 |
| 2009/0251534 A1 | 10/2009 | Fujimoto et al. | |

FOREIGN PATENT DOCUMENTS

| | | |
|---|---|---|
| JP | H08-185503 A | 7/1996 |
| JP | 2002-269545 A | 9/2002 |
| JP | A-2005-140667 | 6/2005 |
| JP | 2006-231963 A | 9/2006 |
| JP | 2006-318374 A | 11/2006 |
| JP | 2007-004448 A | 1/2007 |
| JP | A-2008-027242 | 2/2008 |
| JP | 2008123137 A * | 5/2008 |
| JP | A-2008-123137 | 5/2008 |

OTHER PUBLICATIONS

JP 2008123137 A Machine Translation.*
Office Action dated Sep. 21, 2010 in corresponding Japanese Patent Application No. 2008-293329 (English translation enclosed).
Office Action mailed Sep. 21, 2010 in corresponding JP application No. 2008-293329 (and English translation).

* cited by examiner

*Primary Examiner* — Mehrdad Dastouri
*Assistant Examiner* — Mohammed Rahaman
(74) *Attorney, Agent, or Firm* — Posz Law Group, PLC

(57) ABSTRACT

An image shooting device for an object includes: a first light irradiation element for irradiating first light; a second light irradiation element for irradiating second light; an image shooting element; and a controller. A first irradiation region of the first light irradiation element is partially overlapped with a second irradiation region of the second light irradiation element. The controller controls the image shooting element to shoot a non-irradiation image of the object when no light irradiation element irradiates light. The controller controls the image shooting element to shoot a first image of the object when the first light irradiation element irradiates the first light. The controller controls the image shooting element to shoot a second image of the object when the second light irradiation element irradiates the second light.

10 Claims, 21 Drawing Sheets

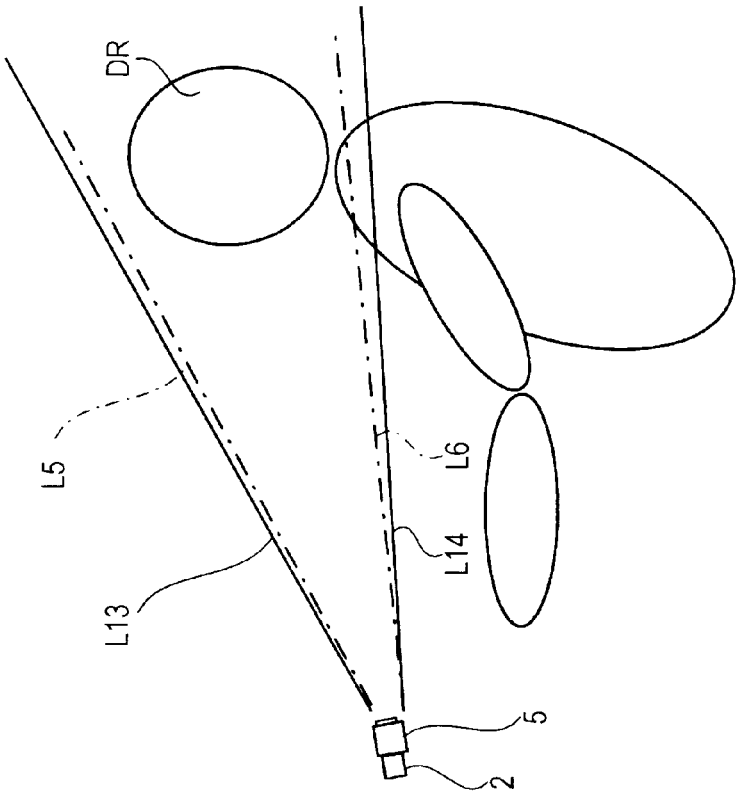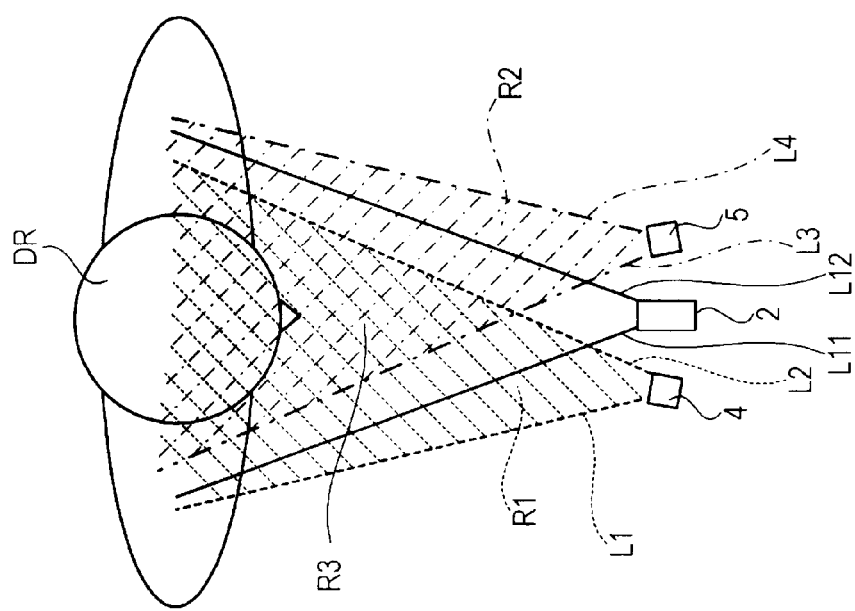

FIG. 6B

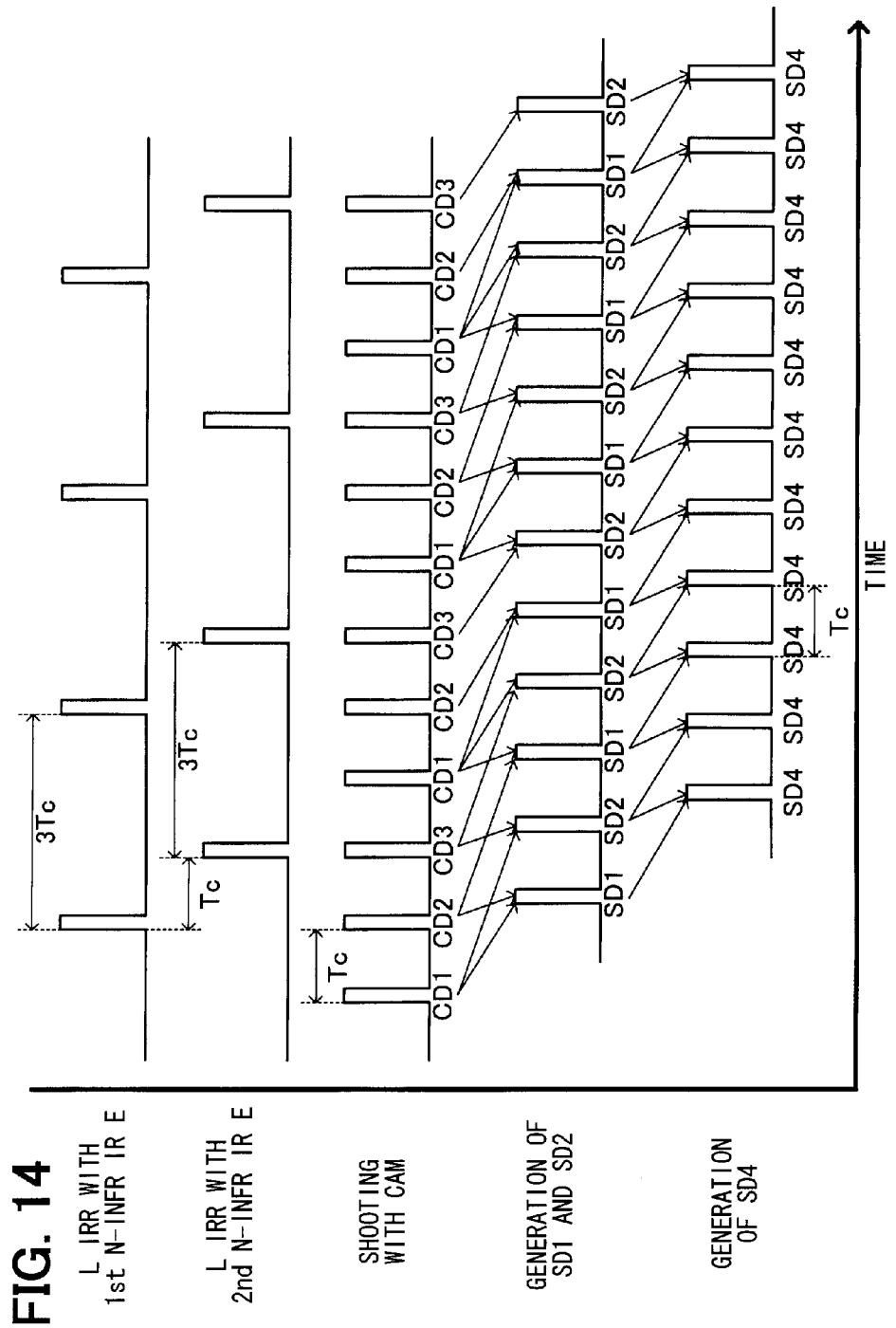

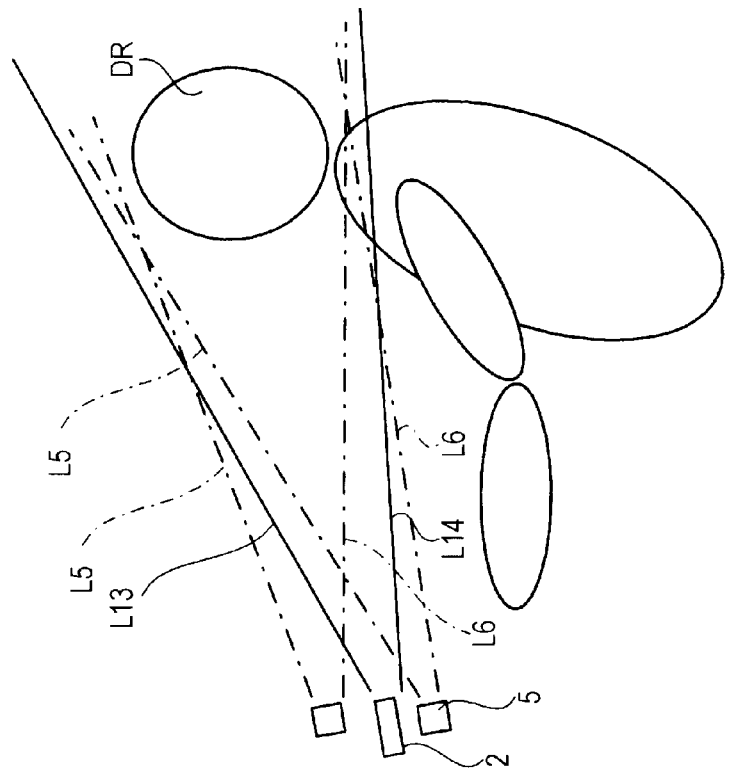
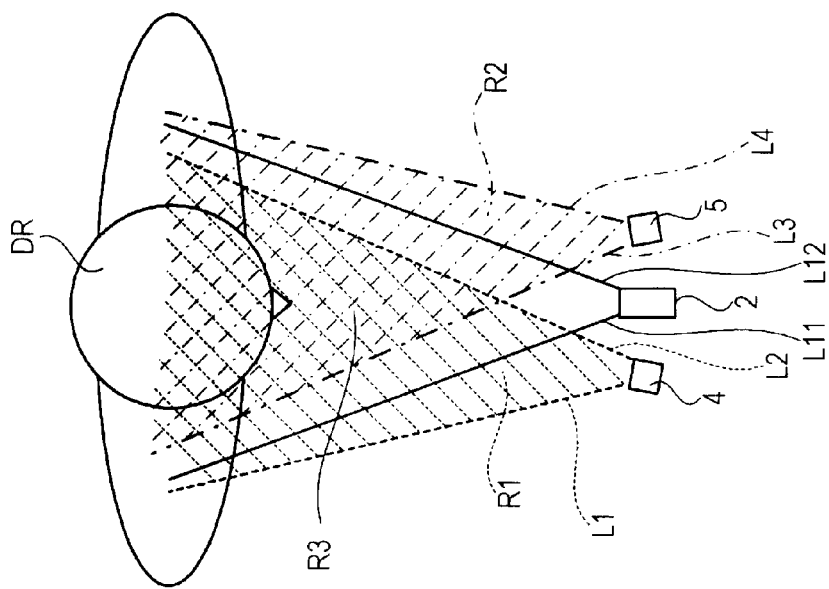
FIG. 16A
FIG. 16B

IMAGE SHOOTING DEVICE AND METHOD FOR SHOOTING IMAGE

CROSS REFERENCE TO RELATED APPLICATION

This application is based on Japanese Patent Application No. 2008-293329 filed on Nov. 17, 2008, the disclosure of which is incorporated herein by reference.

FIELD OF THE INVENTION

The present invention relates to an image shooting device for shooting an image by irradiating light and receiving reflected light and a method for shooting an image.

BACKGROUND OF THE INVENTION

Recently, a driving assist system for improving safety, convenience and comfort of a vehicle for a passenger is disclosed in, for example, JP-A-2006-231963. A technique for detecting a face orientation and/or a direction of an eye is used for the system in the vehicle. The face orientation and the direction of the eye are detected based on a data of an image of a face of a human, which is shot by a device. Specifically, with using the face orientation and the direction of the eye, the system determines whether a driver takes his eye off a road. Further, the system estimates physiological state and psychological state of the driver based on variation of feature positions in his face. Thus, the safety, convenience and comfort for the passenger is improved with using information about the inattentive driving, the physiological state and psychological state of the driver.

Further, a shooting method for shooting a face of a human when near infrared light is irradiated on the face of the human and for shooting the face of the human when the near infrared light is not irradiated on the face is described in, for example, JP-A-2007-4448. In this case, a difference image between a shot image when the near infrared light is irradiated on the face and a shot image when the near infrared light is not irradiated on the face is obtained. With using the difference image, the shot image is obtained with reducing influence of an external light such as sunshine.

However, when the near infrared light is irradiated on face of a person wearing glasses, the near infrared light is reflected on a lens of the glasses and/or a frame of the glasses. Thus, a portion with high brightness appears on the shot image.

To remove the high brightness portion on the image, various methods are proposed. For example, a brightness histogram of picture cells, which provide the shot image, is formed, so that some of picture cells having brightness equal to or larger than a predetermined threshold are specified as a high brightness portion. Then, the brightness in the high brightness portion is replaced with average brightness of periphery picture cells around the high brightness portion so that actual brightness of the high brightness portion is reproduced. This technique is disclosed in, for example, JP-A-2002-269545. Further, another technique is disclosed in JP-A-H08-185503. This technique is such that a first threshold for extracting a reflection image of an eye ball of a human is defined, and a second threshold for extracting a reflection image of glasses worn by the human is defined. Then, based on a shape of a binarized image of a shot image processed with using the first and second thresholds, the reflection image from the glasses is removed.

However, when the techniques in JP-A-2002-269545 and JP-A-H08-185503 are used, and the first and second thresholds are set to be certain values, a picture cell not related to the reflection of the near infrared light may be detected, or the high brightness portion provided by reflection of the near infrared light may not be detected. Thus, from a practical standpoint, reliability of detection of the high brightness portion is reduced.

Further, in the technique in JP-A-2002-269545, the brightness of the high brightness portion is replaced with the average brightness of the periphery picture cells. Accordingly, the replaced picture cells may provide a blurry image, and/or the brightness of the image may be uneven. Thus, the reproducibility of the brightness of the high brightness portion is low.

SUMMARY OF THE INVENTION

In view of the above-described problem, it is an object of the present disclosure to provide an image shooting device for shooting an image with high reliability for detection of a high brightness portion and high reproducibility of brightness of the high brightness portion. It is another object of the present disclosure to provide a method for shooting an image with high reliability for detection of a high brightness portion and high reproducibility of brightness of the high brightness portion.

According to a first aspect of the present disclosure, an image shooting device for shooting an image of an object includes: a first light irradiation element for irradiating first light; a second light irradiation element for irradiating second light; an image shooting element for shooting an image with received light; and a controller. The first light irradiation element has a first irradiation region, in which the first light from the first light irradiation element passes, and the second light irradiation element has a second irradiation region, in which the second light from the second light irradiation element passes. The first irradiation region is partially overlapped with the second irradiation region. The image shooting element is disposed at a predetermined position so that the image shooting element receives light reflected on the object, the light being one of the first and second light The object is arranged in an overlapping region of the first and second irradiation regions. The controller controls the image shooting element to shoot a first image of the object when the first light irradiation element irradiates the first light. The controller stores the first image. The controller controls the image shooting element to shoot a second image of the object when the second light irradiation element irradiates the second light. The controller stores the second image.

In the above device, with using the first image and the second image, the high brightness portion is detected, and the image information at the high brightness portion is reproduced without using a threshold. Thus, reliability of detection of the high brightness portion is improved. Further, it is not necessary to replace the brightness at the high brightness portion with brightness of a periphery portion. Since the brightness at the high brightness portion is replaced with brightness at the high brightness portion which is actually detected, reproducibility of the brightness at the high brightness portion is improved.

According to a second aspect of the present disclosure, a method for shooting an image of an object includes: irradiating first light; irradiating second light; receiving light and shooting an image with using received light with an image shooting element; controlling the image shooting element to shoot a first image of the object when the first light is irradiated; storing the first image; controlling the image shooting element to shoot a second image of the object when the second light is irradiated; and storing the second image. The first light passes in a first irradiation region, and the second light passes in a second irradiation region. The first irradiation region is partially overlapped with the second irradiation region. The image shooting element is arranged at a predetermined position so that the image shooting element receives light reflected on the object, the light being one of the first and second lights. The object is arranged in an overlapping region of the first and second irradiation regions.

In the above method, with using the first image and the second image, the high brightness portion is detected, and the image information at the high brightness portion is reproduced without using a threshold. Thus, reliability of detection of the high brightness portion is improved. Further, it is not necessary to replace the brightness at the high brightness portion with brightness of a periphery portion. Since the brightness at the high brightness portion is replaced with brightness at the high brightness portion which is actually detected, reproducibility of the brightness at the high brightness portion is improved.

According to a third aspect of the present disclosure, an image shooting device for shooting an image of an object includes: a first light irradiation element for irradiating first light; a second light irradiation element for irradiating second light; an image shooting element for shooting an image with received light; and a controller. The first light irradiation element has a first irradiation region, in which the first light from the first light irradiation element passes, and the second light irradiation element has a second irradiation region, in which the second light from the second light irradiation element passes. The first irradiation region is partially overlapped with the second irradiation region. The image shooting element is disposed at a predetermined position so that the image shooting element receives light reflected on the object, the light being one of the first and second light. The object is arranged in an overlapping region of the first and second irradiation regions. The controller controls the image shooting element to shoot a non-irradiation image of the object when no light irradiation element irradiates light. The controller stores the non-irradiation image. The controller controls the image shooting element to shoot a first image of the object when the first light irradiation element irradiates the first light. The controller stores the first image. The controller controls the image shooting element to shoot a second image of the object when the second light irradiation element irradiates the second light, and the controller stores the second image.

In the above device, with using the first image and the second image, the high brightness portion is detected, and the image information at the high brightness portion is reproduced without using a threshold. Thus, reliability of detection of the high brightness portion is improved. Further, since the brightness at the high brightness portion is replaced with brightness at the high brightness portion which is actually detected, reproducibility of the brightness at the high brightness portion is improved. Further, a first difference image between the first image and the non-irradiation image and/or a second difference image between the second image and the non-irradiation image are generated, so that the first or second difference image has small influence of the external light other than the near infrared light.

According to a fourth aspect of the present disclosure, a method for shooting an image of an object includes: irradiating first light; irradiating second light; receiving light and shooting an image with using received light with an image shooting element; controlling the image shooting element to shoot a non-irradiation image of the object when no light is irradiated; storing the non-irradiation image; controlling the image shooting element to shoot a first image of the object when the first light is irradiated; storing the first image; controlling the image shooting element to shoot a second image of the object when the second light is irradiated; and storing the second image. The first light passes in a first irradiation region, and the second light passes in a second irradiation region. The first irradiation region is partially overlapped with the second irradiation region. The image shooting element is arranged at a predetermined position so that the image shooting element receives light reflected on the object, the light being one of the first and second lights. The object is arranged in an overlapping region of the first and second irradiation regions.

In the above method, with using the first image and the second image, the high brightness portion is detected, and the image information at the high brightness portion is reproduced without using a threshold. Thus, reliability of detection of the high brightness portion is improved. Further, since the brightness at the high brightness portion is replaced with brightness at the high brightness portion which is actually detected, reproducibility of the brightness at the high brightness portion is improved. Further, a first difference image between the first image and the non-irradiation image and/or a second difference image between the second image and the non-irradiation image are generated, so that the first or second difference image has small influence of the external light other than the near infrared light.

BRIEF DESCRIPTION OF THE DRAWINGS

The above and other objects, features and advantages of the present invention will become more apparent from the following detailed description made with reference to the accompanying drawings. In the drawings:

FIG. 3A is a top plan view showing a shooting range of the camera and an irradiation range of the near infrared light irradiation elements, and FIG. 3B is a side view showing the shooting range of the camera and the irradiation range of the near infrared light irradiation elements;

FIGS. 6A to 6E are diagrams showing various image data obtained from the shot image of the face of the driver;

FIG. 14 is a time chart for explaining a method for generating a third difference image data according to a second embodiment;

FIG. 16A is a top plan view showing a shooting range of the camera and an irradiation range of the near infrared light irradiation elements according to other embodiments, and FIG. 16B is a side view showing the shooting range of the camera and the irradiation range of the near infrared light irradiation elements;

DETAILED DESCRIPTION OF THE PREFERRED EMBODIMENTS (First Embodiment)

A first embodiment of the present disclosure will be explained as follows with reference to the drawings.

Figure 1:
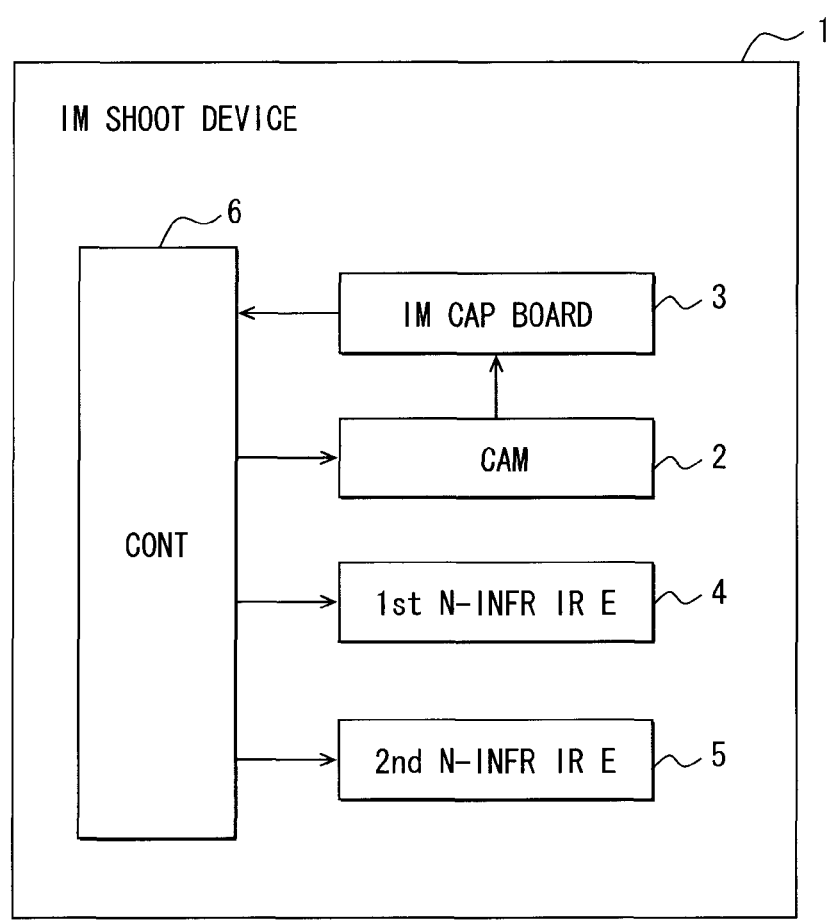
FIG. 1 is a block diagram showing an image shooting device.
Figure 2:
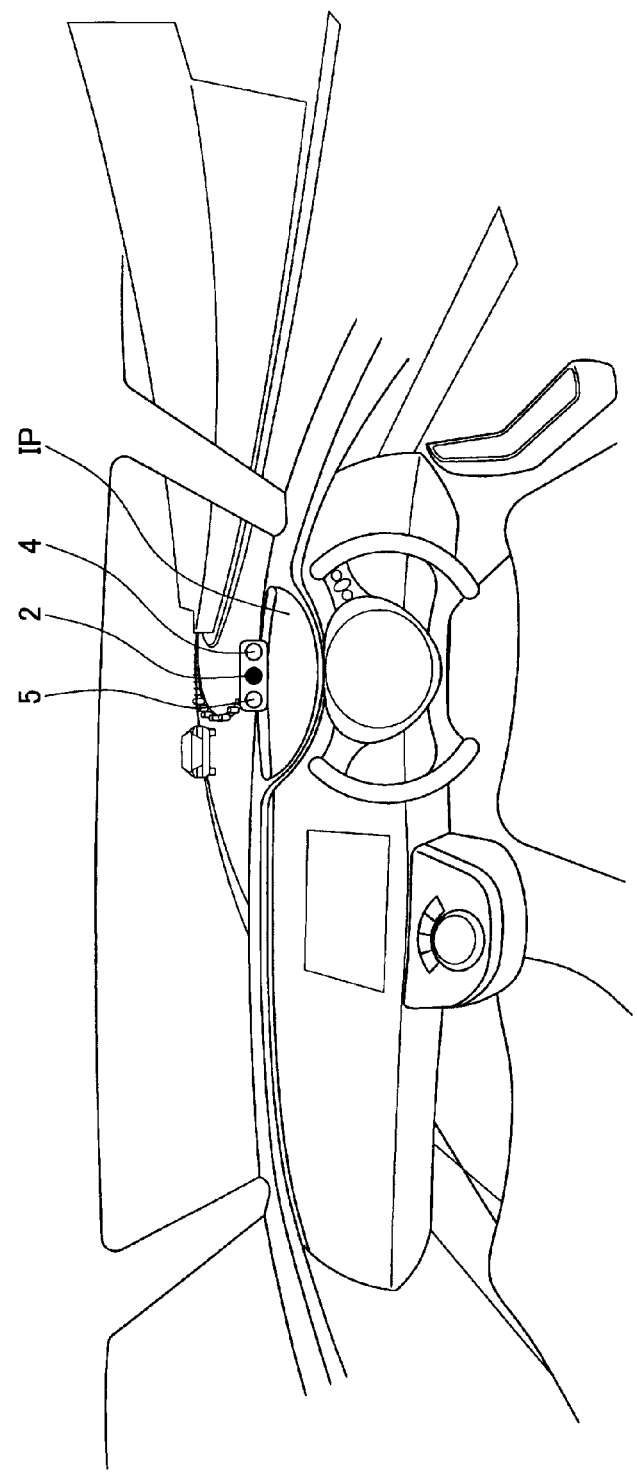
FIG. 2 is a diagram showing an arrangement of a camera and near infrared light irradiation elements.

FIG. 1 shows an image shooting device 1. FIG. 2 shows a view from a driver seat of a vehicle toward a front of the vehicle. Specifically, FIG. 2 shows an arrangement of a camera 2, and a pair of near infrared light irradiation elements 4, 5.

The image shooting device 1 is mounted on the vehicle. The device 1 includes the camera 2, an image capture board 3, a pair of near infrared light irradiation elements 4, 5 and a controller 6. The camera 2 continuously shoots a face of a person sitting on a driver seat, who is a driver DR of the vehicle. The image capture board 3 temporally stores data of an image shot by the camera 2. The near infrared light irradiation elements 4, 5 irradiates near infrared light toward the face of the driver DR. The controller 6 executes an image processing with using the image shot by the camera 2. Further, the controller 6 controls the camera 2 and the pair of the near infrared light irradiation elements 4, 5.

The camera 2 is a conventional camera having an image sensor, a lens and the like. The image sensor includes multiple solid-state image sensing elements, which are arranged in a two-dimensional lattice pattern. Here, the image sensor may be a CCD image sensor or a CMOS image sensor. The lens collects or focuses light from an object on the image sensor.

The image data obtained from the camera 2 is defined as a shot image data. The image data includes multiple picture cells, which are aligned in a two dimensional array having horizontal lines and vertical lines. The number of horizontal lines is M, and the number of vertical lines is N. Here, the number M and N are positive integer number. Thus, the shot image data is composed of image cell data P(X, Y). The number of image cell data is calculated by multiplying M by N. X represents a coordinate of the picture cell in the horizontal direction, and Y represents a coordinate of the picture cell in the vertical direction. Thus, X is one of a group consisting of 0, 1, 2, . . . , and M. Y is one of a group consisting of 0, 1, 2, . . . , and N. The image cell data P(X, Y) represents the brightness of the picture cell arranged at a position of (X, Y). The brightness of the picture cell is defined as one of a group consisting of 0, 1, 2, . . . , and 255 so that the image cell data P(X, Y) is defined as one of 256 levels.

The camera 2 is arranged near an instrumental panel IP so that the camera 2 shoots the face of the driver DR.

Each near infrared light irradiation element 4, 5 includes a LED light source for irradiating the near infrared light having a wavelength of 850 nm, for example. The near infrared light irradiation element 4, 5 is arranged neat the instrumental panel IP so that the near infrared light irradiation element 4, 5 emits the near infrared light toward the face of the driver DR.

FIG. 3A shows a upper plan view of the camera 2 and the near infrared light irradiation elements 4, 5 in order to show an irradiation area of the near infrared light irradiation elements 4, 5 and a shooting range area of the camera 2.

FIG. 3B shows a side view of the camera 2 and the near infrared light irradiation elements 4, 5.

The first near infrared light irradiation element 4 has a first irradiation region R1, which is surrounded with a line L1 and a line L2 in FIG. 3A, so that the near infrared light irradiated from the first near infrared light irradiation element 4 reaches in the first irradiation region R1. The second near infrared light irradiation element 5 has a second irradiation region R2, which is surrounded with a line L3 and a line L4 in FIG. 3A, so that the near infrared light irradiated from the second near infrared light irradiation element 5 reaches in the second irradiation region R2. Thus, the first irradiation region R1 is partially overlapped with the second irradiation region R2.

The overlapped irradiation region R3 is obtained from an overlapping region of the first and second irradiation regions R1 and R2. The first and second near infrared light irradiation elements 4, 5 irradiates the near infrared light such that a whole of the head of the driver DR is disposed in the overlapped irradiation region R3. Thus, the overlapped irradiation region R3 is surrounded with the line L5 and the line L6 in FIG. 3B. The head of the driver DR is arranged between the line L5 and the line L6.

The camera 2 is arranged to shoot the whole of the face of the driver DR. Specifically, the camera 2 has a shooting range area, which is surrounded with the line L11 and the line L12 in the horizontal direction. Further, the shooting range area is surrounded with the line L13 and line L14 in the vertical direction. Further, the camera 2 is arranged on a line connecting between the arrangement point of the first near infrared light irradiation element 4 and the arrangement point of the second near infrared light irradiation element 5. Further, the camera 2 is arranged at a middle point between the arrangement point of the first near infrared light irradiation element 4 and the arrangement point of the second near infrared light irradiation element 5.

The controller 6 is a conventional micro computer that includes a CPU, a ROM, a RAM, a I/O device and a bus line for connecting among the CPU, the ROM the RAM and the I/O device. Based on a program stored in the ROM and/or the RAM, the controller 6 executes various processes.

In the image shooting device 1, the controller 1 executes to shoot the face of the driver DR and executes a reflection light removing process for removing the influence of the reflection light from the shot image.

Figure 4:
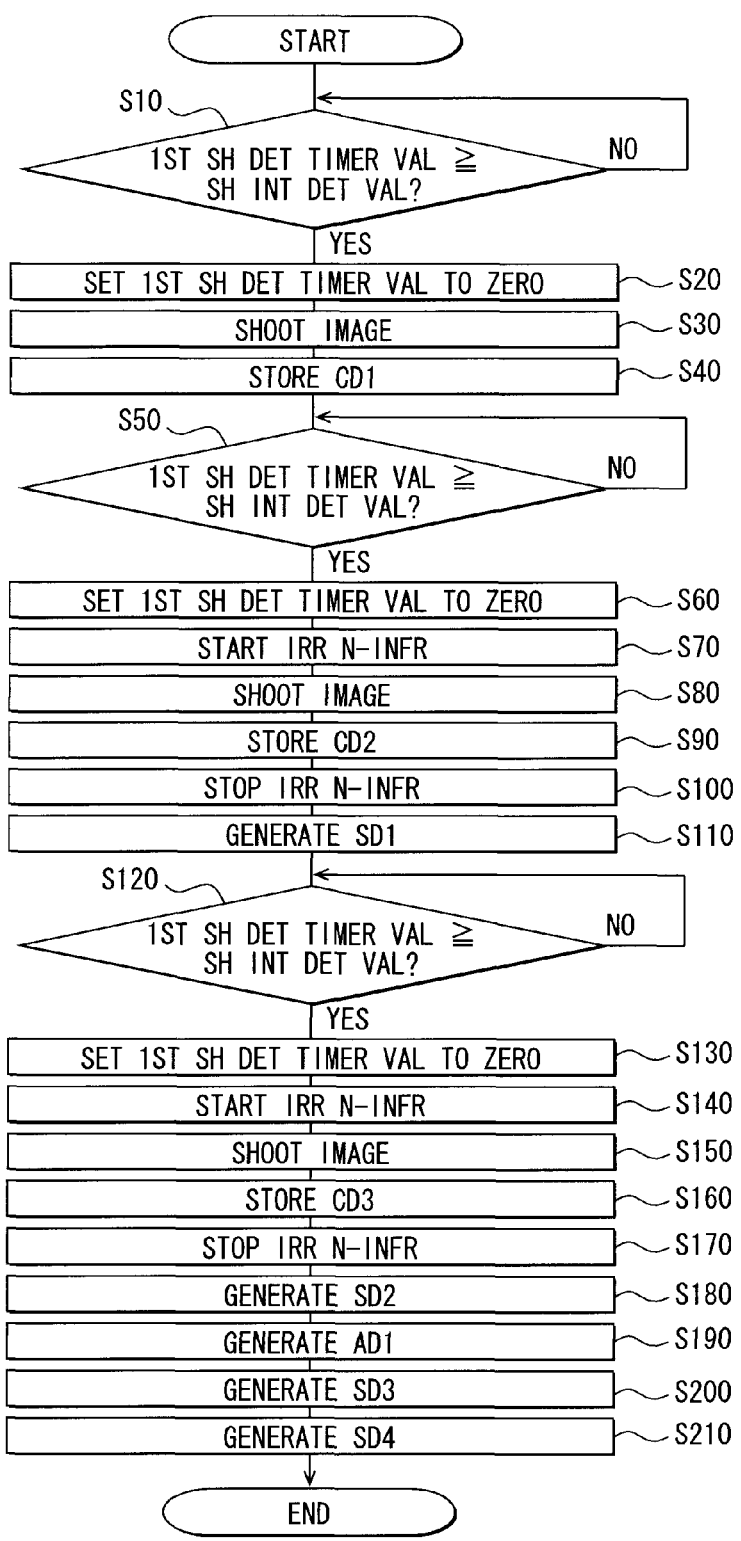
FIG. 4 is a flowchart showing a reflection light removing process.

The controller 6 of the image shooting device 1 executes the reflection light removing process in FIG. 4. The reflection light removing process is repeatedly executed when the controller 6 turns on, i.e., when the controller is active.

When the reflection light removing process is executed, the controller 6 determines whether a first shooting determination timer value is equal to or larger than a predetermined shooting interval determination value, which is for example, 16.6 milliseconds. Here, the first shooting determination timer value is set in the first shooting determination timer TM1, which is a timer that increments the value automatically at each period such as one microsecond. When the first shooting determination timer value is reset to be zero at a certain time, the first shooting determination timer increments the first shooting determination timer value from zero since that time.

When the first shooting determination timer value is smaller than the shooting interval determination value, i.e., when the determination in Step S10 is "NO," Step S10 is repeated. When the first shooting determination timer value is equal to or larger than the shooting interval determination value, i.e., when the determination in Step S10 is "YES," in Step S20, the first shooting determination timer value is reset to be zero. Then, in Step S30, an image is shot by the camera 2, and data of the image shot by the camera 2 is generated. The data of the image is defined as a shot image data. The shot image data generated in Step S30 is defined as a non-irradiation shot image data CD1. Then, in Step S40, the non-irradiation shot image data CD1 is stored in the RAM of the controller 6.

Then, in Step S50, the controller 6 determines whether the first shooting determination timer value is equal to or larger than the shooting interval determination value. When the first shooting determination timer value is smaller than the shooting interval determination value, i.e., when the determination in Step S50 is "NO," Step S50 is repeated. When the first shooting determination timer value is equal to or larger than the shooting interval determination value, i.e., when the determination in Step S50 is "YES," in Step S60, the first shooting determination timer value is reset to be zero. Then, in Step S70, the controller 6 controls the first near infrared light irradiation element 4 to start irradiating the near infrared light.

Then, in Step S80, an image is shot by the camera 2, and data of the image shot by the camera 2 is generated. The data of the image is defined as a shot image data. The shot image data generated in Step S80 is defined as a first irradiation shot image data CD2. Then, in Step S90, the first irradiation shot image data CD2 is stored in the RAM of the controller 6.

Then, in Step S100, the controller 6 controls the first near infrared light irradiation element 4 to stop irradiating the near infrared light. In Step S110, difference between brightness of the non-irradiation shot image data CD1 obtained in Step S30 and brightness of the first irradiation shot image data CD2 obtained in Step S80 is calculated so that an image data as a first difference image data SD1 is obtained.

Here, the calculation of the difference between the brightness of the non-irradiation shot image data CD1 and the brightness of the first irradiation shot image data CD2 means that the brightness of the picture cell data Pn (X, Y) providing the non-irradiation shot image data CD1 and the brightness of the picture cell data Pa (X, Y) providing the first irradiation shot image data CD2 are subtracted from each other. Here, the picture cell data Pn (X, Y) and the picture cell data Pa (X, Y) have the same horizontal coordinate and the vertical coordinate.

Specifically, when the horizontal coordinate in the first difference image data SD1 is X, and the vertical coordinate in the first difference image data SD1 is Y, the first difference image data SD1 is defined as Pc (X, Y). The first difference image picture cell data Pc (X, Y) is calculated from the formula F1.

$$Pc(X,Y)=Pa(X,Y)-Pn(X,Y) \tag{F1}$$

Here, when the first difference image picture cell data Pc (X, Y) is smaller than zero, the first difference image picture cell data Pc (X, Y) is set to be zero, so that deterioration of the difference image caused by noise or the like is prevented.

Then, in Step S120, the controller 6 determines whether the first shooting determination timer value is equal to or larger than the shooting interval determination value. When the first shooting determination timer value is smaller than the shooting interval determination value, i.e., when the determination in Step S120 is "NO," Step S120 is repeated. When the first shooting determination timer value is equal to or larger than the shooting interval determination value, i.e., when the determination in Step S120 is "YES," in Step S130, the first shooting determination timer value is reset to be zero. Then, in Step S140, the controller 6 controls the second near infrared light irradiation element 5 to start irradiating the near infrared light.

Then, in Step S150, an image is shot by the camera 2, and data of the image shot by the camera 2 is generated. The data of the image is defined as a shot image data. The shot image data generated in Step S150 is defined as a second irradiation shot image data CD3. Then, in Step S160, the second irradiation shot image data CD3 is stored in the RAM of the controller 6.

Then, in Step S170, the controller 6 controls the second near infrared light irradiation element 5 to stop irradiating the near infrared light. In Step S180, difference between brightness of the non-irradiation shot image data CD1 obtained in Step S30 and brightness of the second irradiation shot image data CD3 obtained in Step S150 is calculated so that an image data as a second difference image data SD2 is obtained.

Here, the calculation of the difference between the brightness of the non-irradiation shot image data CD1 and the brightness of the second irradiation shot image data CD3 means that the brightness of the picture cell data Pn (X, Y) providing the non-irradiation shot image data CD1 and the brightness of the picture cell data Pb (X, Y) providing the second irradiation shot image data CD3 are subtracted from each other. Here, the picture cell data Pn (X, Y) and the picture cell data Pb (X, Y) have the same horizontal coordinate and the vertical coordinate.

Specifically, when the horizontal coordinate in the second difference image data SD2 is X, and the vertical coordinate in the second difference image data SD2 is Y, the second difference image data SD2 is defined as Pd (X, Y). The second difference image picture cell data Pd (X, Y) is calculated from the formula F2.

$$Pd(X,Y)=Pb(X,Y)-Pn(X,Y) \tag{F2}$$

Here, when the second difference image picture cell data Pd (X, Y) is smaller than zero, the second difference image picture cell data Pd (X, Y) is set to be zero, so that deterioration of the difference image caused by noise or the like is prevented.

In Step S190, the first difference image data SD1 and the second difference image data SD2 are added to each other so that an addition image data AD1 is obtained.

Specifically, when the horizontal coordinate in the addition image data AD1 is X, and the vertical coordinate in the addition image data AD1 is Y, the addition image data AD1 is defined as Pe (X, Y). The addition image picture cell data Pe (X, Y) is calculated from the formula F3.

$$Pe(X,Y)=Pc(X,Y)+Pd(X,Y) \quad (F3)$$

Further, in Step S200, an absolute value of difference between brightness of the first difference image data SD1 obtained in Step S110 and the brightness of the second difference image data SD2 obtained in Step S180 is calculated so that an image data as an absolute value of difference image data SD3 is obtained.

Specifically, when the horizontal coordinate in the absolute value of difference image data SD3 is X, and the vertical coordinate in the absolute value of difference image data SD3 is Y, the absolute value of difference image data SD3 is defined as Pf (X, Y). The absolute value of difference image picture cell data Pf (X, Y) is calculated from the formula F4.

$$Pf(X,Y)=|Pc(X,Y)-Pd(X,Y)| \quad (F4)$$

Further, in Step S210, difference between brightness of the addition image data AD1 obtained in Step S190 and the brightness of the absolute value of difference image data SD3 obtained in Step S200 is calculated so that an image data as a third difference image data SD4 is obtained.

Specifically, when the horizontal coordinate in third difference image data SD4 is X, and the vertical coordinate in the third difference image data SD4 is Y, the third difference image data SD4 is defined as Pg (X, Y). The third difference image picture cell data Pg (X, Y) is calculated from the formula F5.

$$Pg(X,Y)=Pe(X,Y)-Pf(X,Y) \quad (F5)$$

Here, when the third difference image picture cell data Pg (X, Y) is smaller than zero, the third difference image picture cell data Pg (X, Y) is set to be zero, so that deterioration of the difference image caused by noise or the like is prevented.

After Step S210, the reflection light removing process ends. In the image shooting device 1, the camera 2 is disposed in a certain position so that the camera 2 can receive the light reflected on the head of the driver DR as a shooting object, which is arranged in the overlapped irradiation region R3. The camera 2 can shoot the shooting object when the first near infrared light irradiation element 4 irradiates the near infrared light on the shooting object, and further shoot the object when second near infrared light irradiation element 5 irradiates the near infrared light on the shooting object.

Further, the first irradiation region R1 and the second irradiation region R2 are partially overlapped. Specifically, the first irradiation region R1 is not completely overlapped on the second irradiation region R2. i.e., the first irradiation region R1 is not the same as the second irradiation region R2. Accordingly, when the first near infrared light irradiation element 4 irradiates the near infrared light on the shooting object, a first high brightness reflection position LP1 is defined on the shooting object. The first high brightness reflection position LP1 provides high brightness when the near infrared light from the first near infrared light irradiation element 4 is reflected on the shooting object. When the second near infrared light irradiation element 5 irradiates the near infrared light on the shooting object, a second high brightness reflection position LP2 is defined on the shooting object. The second high brightness reflection position LP2 provides high brightness when the near infrared light from the second near infrared light irradiation element 5 is reflected on the shooting object. The first high brightness reflection position LP1 is different from the second high brightness reflection position LP2 since the first irradiation region R1 is not the same as the second irradiation region R2.

Thus, image information at the first high brightness reflection position LP1 in the first difference image data SD1 obtained in Step S110 is lost. However, image information at the first high brightness reflection position LP1 in the second difference image data SD2 obtained in Step S180 is not lost. Similarly, image information at the second high brightness reflection position LP2 in the second difference image data SD2 obtained in Step S180 is lost. However, image information at the second high brightness reflection position LP2 in the first difference image data SD1 obtained in Step S110 is not lost.

Accordingly, the image information at the high brightness portion can be reproducible, and the image having the image information at the high brightness portion, which is reproduced, is obtained according to the following procedure.

First, difference between the first difference image data SD1 and the second difference image data SD2 is calculated so that a twice difference image data is obtained.

Here, the brightness at the first high brightness reflection position LP1 in the first difference image data SD1 is high. However, the brightness at the first high brightness reflection position LP1 in the second difference image data SD2 is not high. Similarly, the brightness at the second high brightness reflection position LP2 in the second difference image data SD2 is high. However, the brightness at the second high brightness reflection position LP2 in the first difference image data SD1 is not high. Further, the brightness at the other portion of the first and second high brightness reflection positions LP1, LP2 in the first difference image data SD1 is substantially the same as the brightness at the other portion of the first and second high brightness reflection positions LP1, LP2 in the second difference image data SD2. Specifically, the brightness of overlapping portion of the first and second difference image data SD1, SD2 in the first difference image data SD1 is the same as the brightness of overlapping portion of the first and second difference image data SD1, SD2 in the second difference image data SD2.

In this case, the twice difference image data provides the high brightness at the first and second high brightness reflection positions LP1, LP2 and the zero brightness at the other portions of the first and second high brightness reflection positions LP1, LP2, which are disposed in the overlapping portion of the first and second difference image data SD1, SD2.

Specifically, the brightness at the first and second high brightness reflection positions LP1, LP2 in the twice difference image data is high. The brightness at the other portions of the first and second high brightness reflection positions LP1, LP2 in the twice difference image data is zero. Accordingly, the high brightness portion is easily detected.

Accordingly, it is not necessary to use a threshold for detecting the high brightness portion. Thus, the image shooting device 1 prevents detecting a portion other than the high brightness portion as the high brightness portion in a case where the threshold is a certain value, and further, prevents not detecting the high brightness portion in a case where the threshold is another certain value. Accordingly, the reliability for detecting the high brightness portion is improved.

Next, the first difference image data SD1 is compared with the twice difference image data. Thus, the high brightness portion in the first difference image data SD1 is specified. Further, the second difference image data SD2 is compared with the twice difference image data. Thus, the high brightness portion in the second difference image data SD2 is specified.

Then, the image information at the first high brightness reflection position LP1 in the first difference image data SD1 is replaced with the image information at the first high brightness reflection position LP1 in the second difference image data SD2. Alternatively, the image information at the second high brightness reflection position LP2 in the second difference image data SD2 is replaced with the image information at the second high brightness reflection position LP2 in the first difference image data SD1. Thus, the brightness of the high brightness portion is reproduced.

Thus, it is not necessary to replace the brightness of the high brightness portion with the brightness of the periphery portion. Instead, the brightness of the high brightness portion is replaced with the image information of the high brightness portion, which is actually obtained from the shot image. Accordingly, the reproducibility of the brightness of the high brightness portion is improved.

The light emitted from the near infrared light irradiation elements 4, 5 is the near infrared light. When both of the near infrared light irradiation elements 4, 5 do not emit the light, the camera 2 shoots the face of the driver DR so that the non-irradiation shot image data CD1 is generated in Step S30.

Accordingly, the non-irradiation shot image data CD1 may include influence of light other than the near infrared light, which is external ambient light such as sunshine. However, the non-irradiation shot image data CD1 does not include the influence of the near infrared light. Accordingly, the first irradiation shot image data CD2 generated in Step S80, the second irradiation shot image data CD3 generated in Step S150, the first difference image data SD1 obtained from the difference between the non-irradiation shot image data CD1 and the first irradiation shot image data CD2, and the second difference image data SD2 obtained from the difference between the non-irradiation shot image data CD1 and the second irradiation shot image data CD3 are generated, so that the shot image data with reducing the influence of the light other than the near infrared light is obtained.

The reflection light removing process in FIG. 4 provides the image, in which the high brightness portion is reproduced. This process will be explained with reference to FIGS. 5 and 6.

Figure 5:
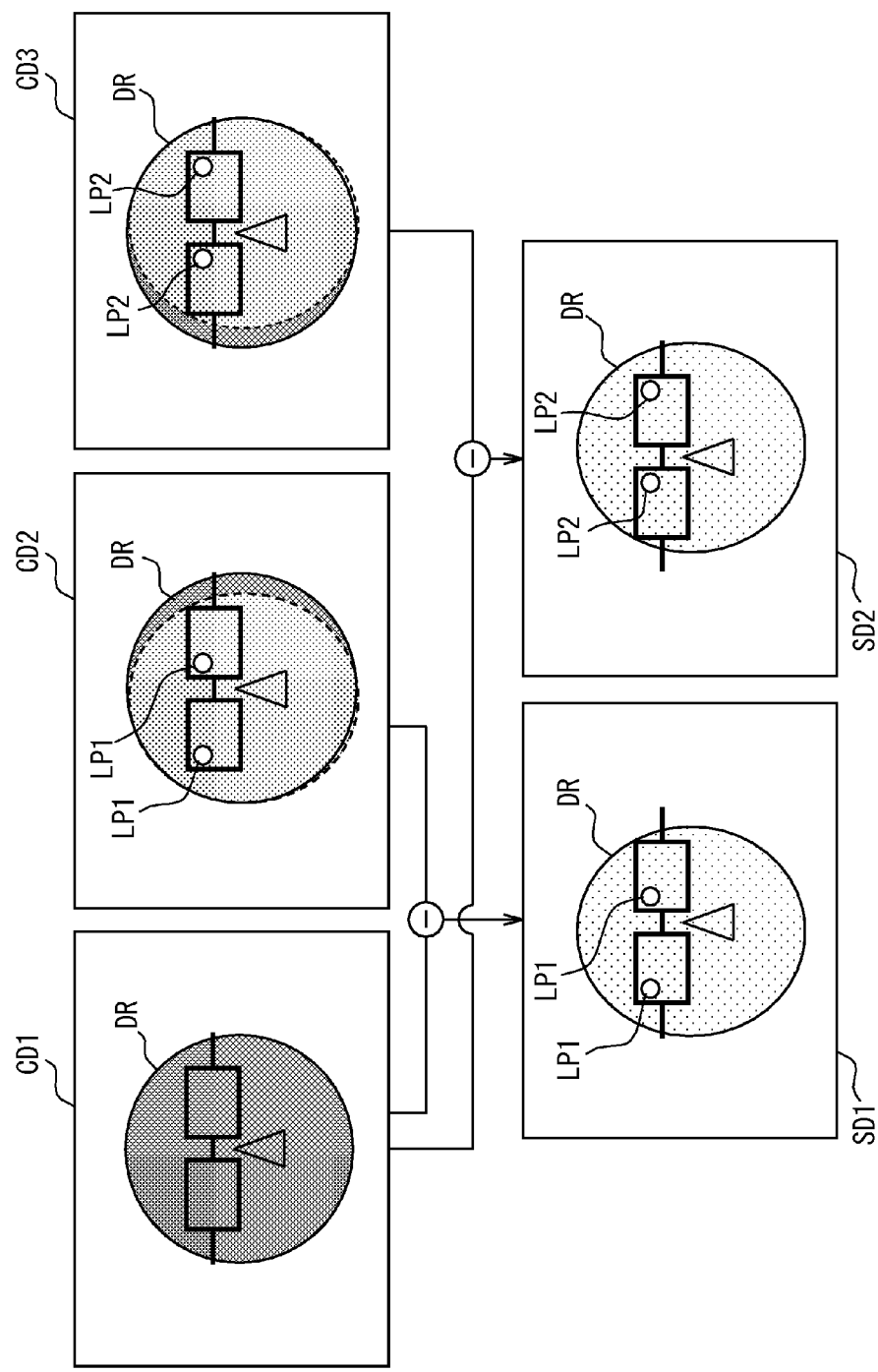
FIG. 5 is a diagram showing an image data obtained from a shot image of a face of a driver.

FIG. 5 shows the non-irradiation shot image data CD1, the first irradiation shot image data CD2, the second irradiation shot image data CD3, the first difference image data SD1, and the second difference image data SD2, which are obtained from images of the face of the driver DR wearing the glasses. FIG. 6 shows the first difference image data SD1, and the second difference image data SD2, the addition image data AD1, the absolute value of difference image data SD3, and the third difference image data SD4, which are obtained from processing the images of the face of the driver DR wearing the glasses.

The non-irradiation shot image data CD1 is obtained from the image, which is shot under a condition that the pair of near infrared light irradiation elements 4, 5 do not emit the near infrared light. As shown in FIG. 5, the non-irradiation shot image data CD1 represents the image having the low brightness of a whole of the face. Further, the first irradiation shot image data CD2 represents the image, which is shot under a condition that the first near infrared light irradiation element 4 irradiates the near infrared light on the face of the driver DR from a diagonally forward right side of the driver DR. Thus, the brightness of the left periphery of the face is low, and the brightness of other portion of the image is comparatively high. The second irradiation shot image data CD3 represents the image, which is shot under a condition that the second near infrared light irradiation element 5 irradiates the near infrared light on the face of the driver DR from a diagonally forward left side of the driver DR. Thus, the brightness of the right periphery of the face is low, and the brightness of other portion of the image is comparatively high.

Thus, the first difference image data SD1, which is obtained by subtracting the brightness of the first irradiation shot image data CD2 from the brightness of the non-irradiation shot image data CD1, represents the image of the face, from which a part of the image providing the left periphery of the face is removed. The second difference image data SD2, which is obtained by subtracting the brightness of the second irradiation shot image data CD3 from the brightness of the non-irradiation shot image data CD1, represents the image of the face, from which a part of the image providing the right periphery of the face is removed.

Thus, the part of the image providing the left periphery of the face is removed from the image of the first difference image data SD1, and the part of the image is shot by receiving light other than the near infrared light reflected on the left periphery. The part of the image providing the right periphery of the face is removed from the image of the second difference image data SD2, and the part of the image is shot by receiving light other than the near infrared light reflected on the right periphery.

Here, the first high brightness reflection position LP1 of the first difference image data SD1 is different from the second high brightness reflection position LP2 of the second difference image data SD2.

Figure 6A:
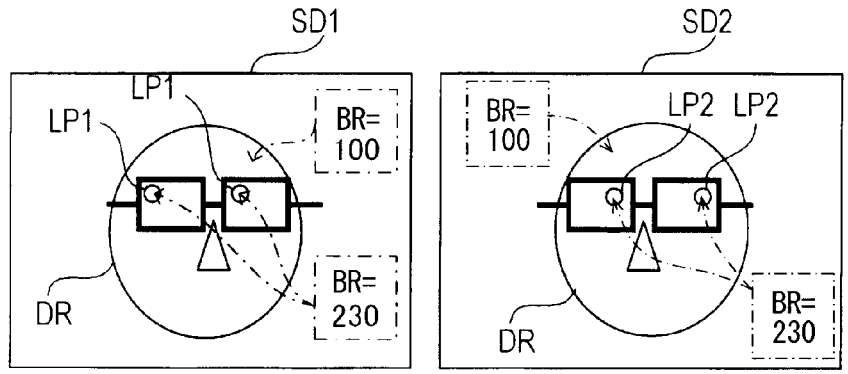

As shown in FIGS. 6A and 6B, the brightness at the first high brightness reflection position LP1 of the first difference image data SD1 is defined as, for example, 230. The brightness at the other portions of the first difference image data SD1 is defined as, for example, 100. The brightness at the second high brightness reflection position LP2 of the second difference image data SD2 is defined as, for example, 230. The brightness at the other portions of the second difference image data SD2 is defined as, for example, 100.

Figure 6C:
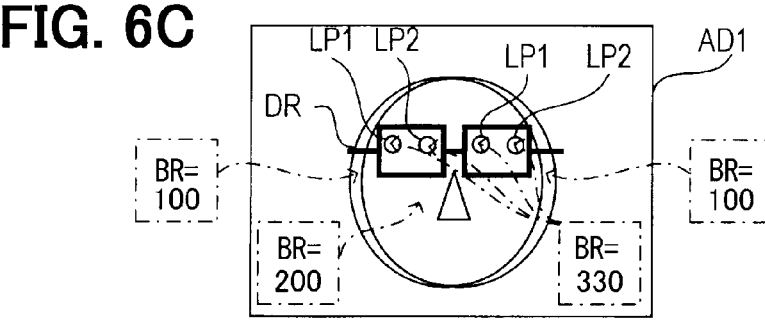

In this case, the addition image data AD1, which is obtained by adding the first difference image data SD1 and the second difference image data SD2, has the brightness of 330 at the first and second high brightness reflection positions LP1, LP2, the brightness of 200 at a center portion of the face other than the first and second high brightness reflection positions LP1, LP2, and the brightness of 100 at the right and left peripheries of the face, as shown in FIG. 6C.

Figure 6D:
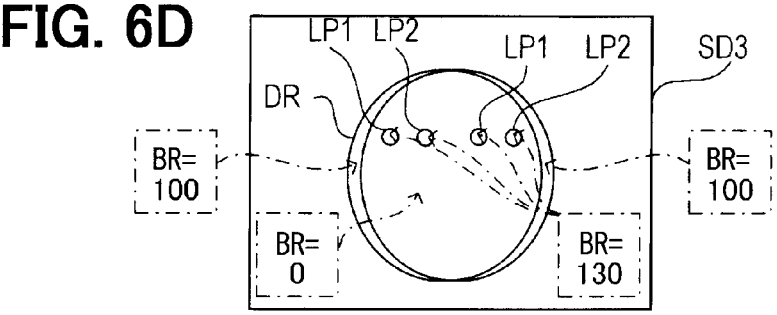

Further, the absolute value of difference image data SD3, which is an absolute value of difference between the brightness of the first difference image data SD1. and the brightness of the second difference image data SD2, has the brightness of 130 at the first and second high brightness reflection positions LP1, LP2, the brightness of zero at the center portion of the face other than the first and second high brightness reflection positions LP1, LP2, and the brightness of 100 at the right and left peripheries of the face, as shown in FIG. 6D.

Figure 6E:
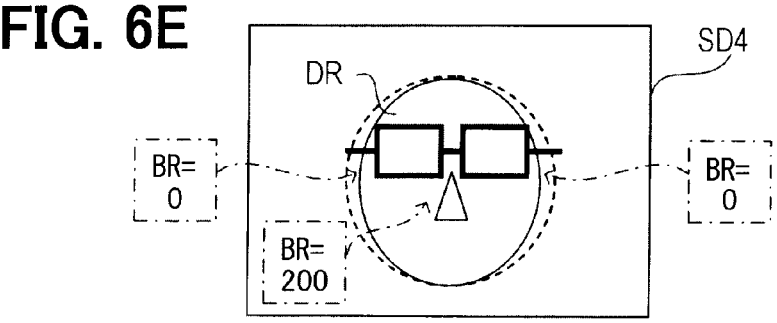

Thus, the third difference image data SD4, which is obtained by subtracting the brightness of the absolute value of difference image data SD3 from the brightness of the addition image data AD1, has the brightness of 200 at the first and second high brightness reflection positions LP1, LP2, the brightness of 200 at the center portion of the face other than the first and second high brightness reflection positions LP1, LP2, and the brightness of zero at the right and left peripheries of the face, as shown in FIG. 6E.

The image shooting device 1 executes the reflection light removing process so that the following result is obtained.

Figure 7A:
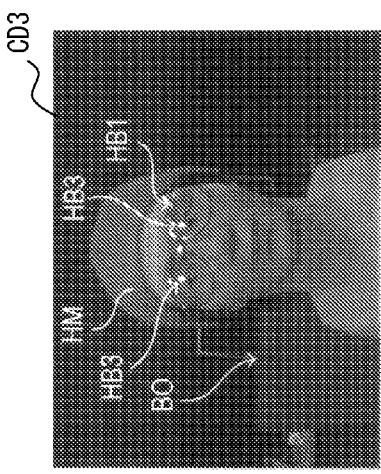
FIGS. 7A, 7C, 7E, 7G, 7I and 7K are photographs showing the face of the human wearing large glasses and facing a front side.
Figure 7C:
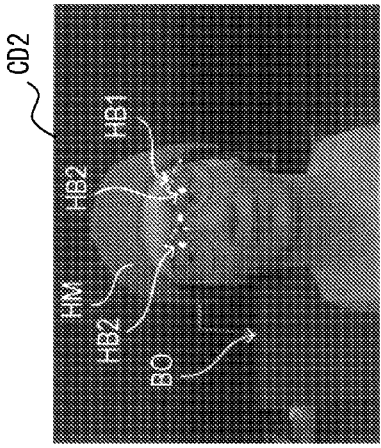
Figure 7E:
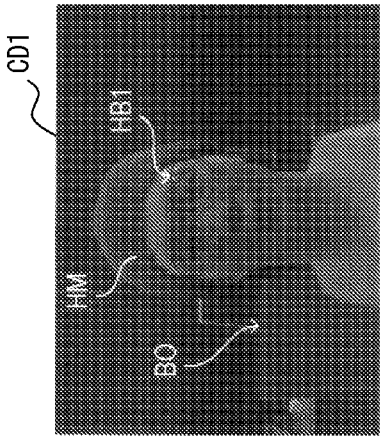
Figure 7B:
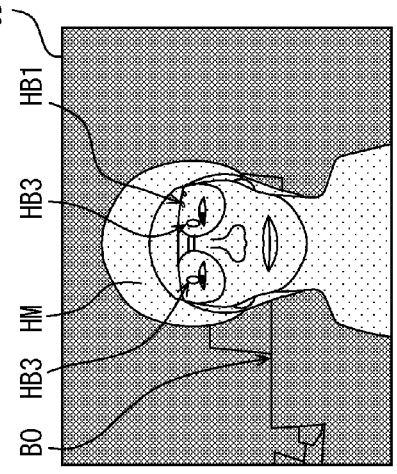
FIGS. 7B, 7D, 7F, 7H, 7J and 7L are diagrams corresponding to the photographs in FIGS. 7A, 7C, 7E, 7G, 7I and 7K, respectively.
Figure 7D:
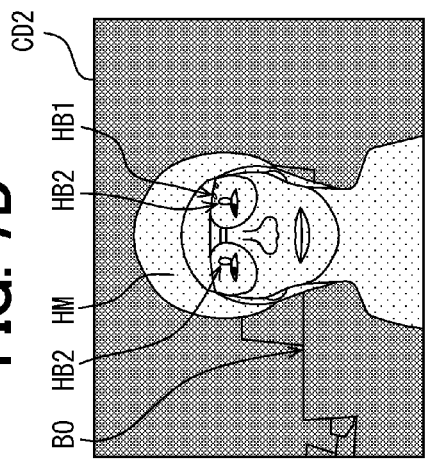
Figure 7F:
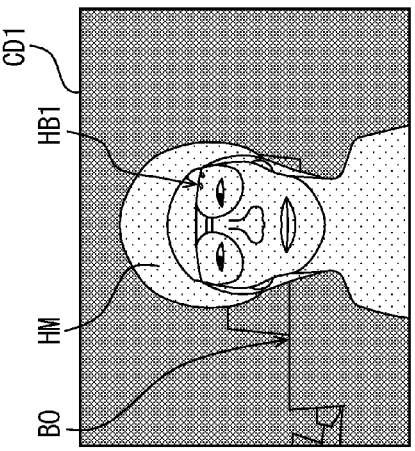
Figure 7G:
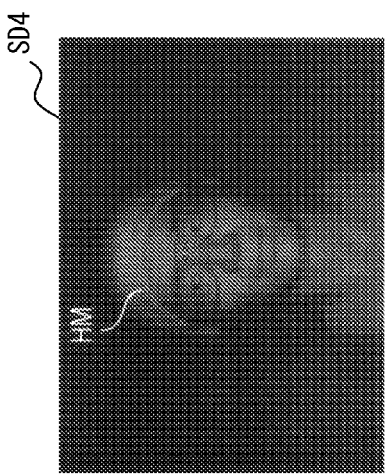
Figure 7I:
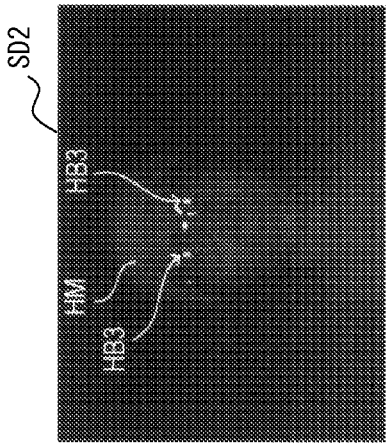
Figure 7K:
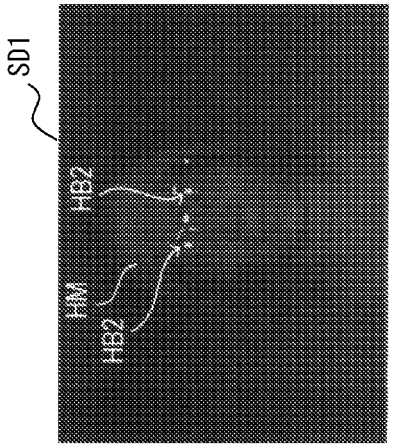
Figure 7H:
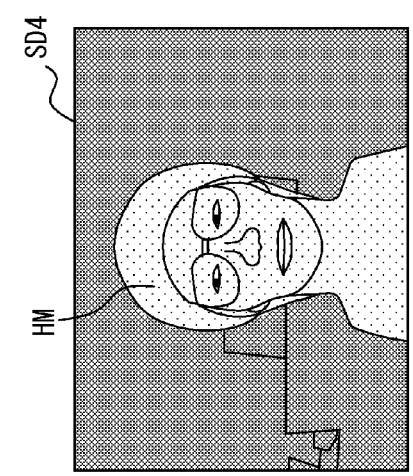
Figure 7J:
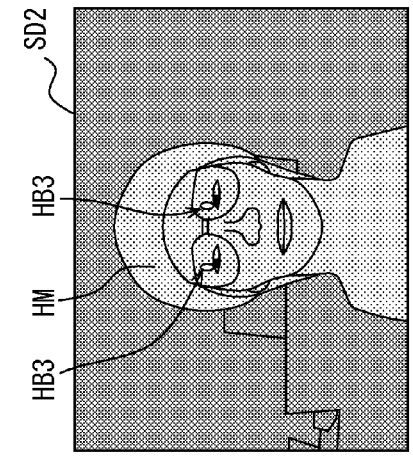
Figure 7L:
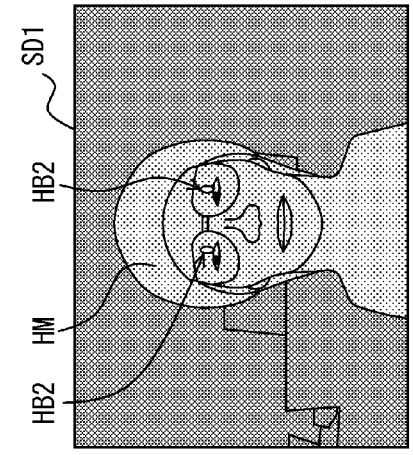

FIG. 7A shows the non-irradiation shot image data CD1 obtained by shooting the face of the human HM, who faces a front side and wears large glasses. FIG. 7B is an illustrative diagram of the non-irradiation shot image data CD1 in FIG. 7A. FIG. 7C shows the first irradiation shot image data CD2, and FIG. 7D is an illustrative diagram of first irradiation shot image data CD2 in FIG. 7C. FIG. 7E shows the second irradiation shot image data CD3, and FIG. 7F is an illustrative diagram of the second irradiation shot image data CD3 in FIG. 7E. FIG. 7G shows the first difference image data SD1, and FIG. 7H is an illustrative diagram of the first difference image data SD1 in FIG. 7G. FIG. 7I shows the second difference image data SD2, and FIG. 7J is an illustrative diagram of the second difference image data SD2 in FIG. 7J. FIG. 7K shows the third difference image data SD4, and FIG. 7L is an illustrative diagram of the third difference image data SD4 in FIG. 7K.

In the non-irradiation shot image data CD1, the first high brightness portion HB1 caused by the external light is disposed on an upper side of the human HM, and the background object BO is disposed on the back of the human HM.

In the first irradiation shot image data CD2, the first high brightness portion HB1, the background object BO and the second high brightness portion HB2 caused by the near infrared light emitted from the near infrared light irradiation element 4 are disposed.

In the second irradiation shot image data CD3, the first high brightness portion HB1, the background object BO and the third high brightness portion HB3 caused by the near infrared light emitted from the near infrared light irradiation element 5 are disposed.

In the first difference image data SD1, the first high brightness portion HB1 and the background object BO are not disposed, and the second high brightness portion HB2 is disposed. Thus, the first difference image data SD1. provides the image, from which a part of the image is removed, the part being shot by the external light other than the near infrared light and being the first high brightness portion HB1 and the background object BO.

Similarly, in the second difference image data SD2, the first high brightness portion HB1 and the background object BO are not disposed, and the third high brightness portion HB3 is disposed. Thus, the second difference image data SD2 provides the image, from which a part of the image is removed, the part being shot by the external light other than the near infrared light and being the first high brightness portion HB1 and the background object BO.

In the third difference image data SD4, the first to third high brightness portions HB1-HB3 and the background object BO are not disposed. Thus, the third difference image data SD4 provides the image, from which the part of the image is removed, the part being shot by the external light other than the near infrared light, and further, the second and third high brightness portions HB2-HB3 are reproduced in the image.

Figure 8A:
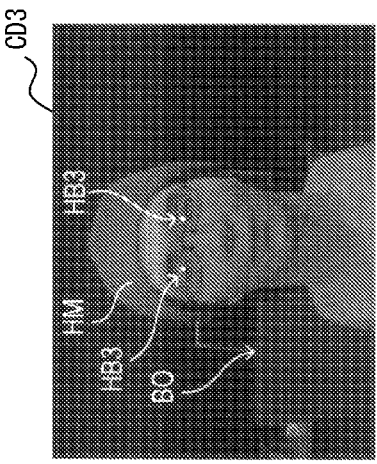
FIGS. 8A, 8C, 8E, 8G, 8I and 8K are photographs showing the face of the human wearing small glasses and facing a front side.
Figure 8B:
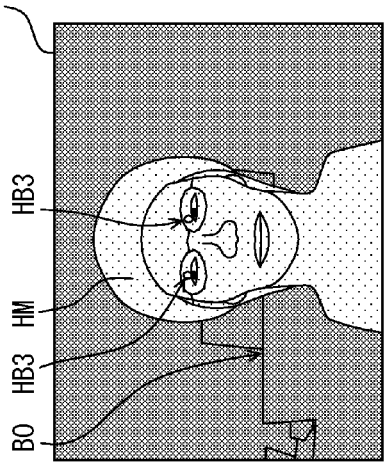
FIGS. 8B, 8D, 8F, 8H, 8J and 8L are diagrams corresponding to the photographs in FIGS. 8A, 8C, 8E, 8G, 8I and 8K, respectively.
Figure 8C:
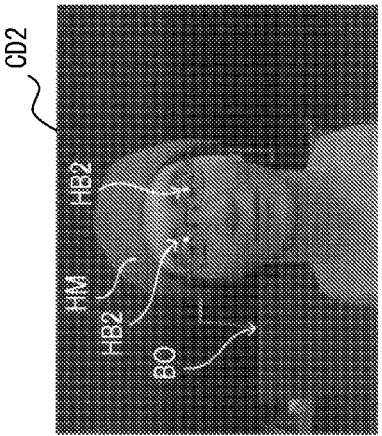
Figure 8D:
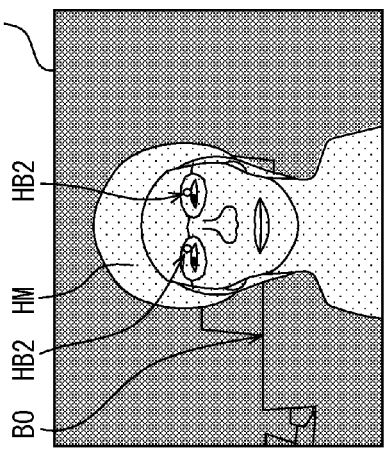
Figure 8E:
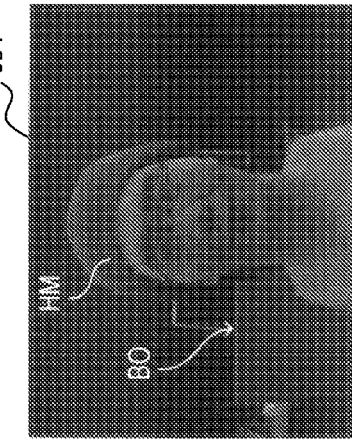
Figure 8F:
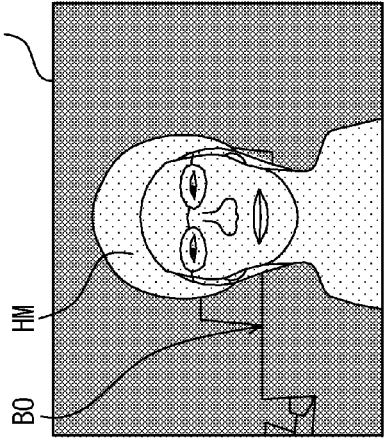
Figure 8K:
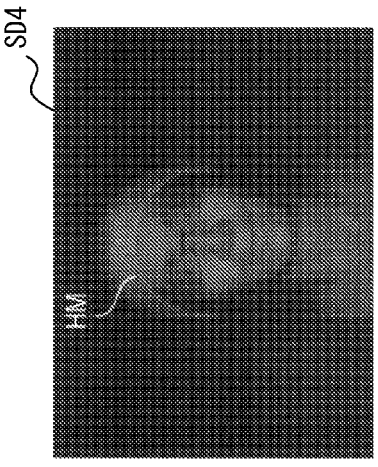
Figure 8I:
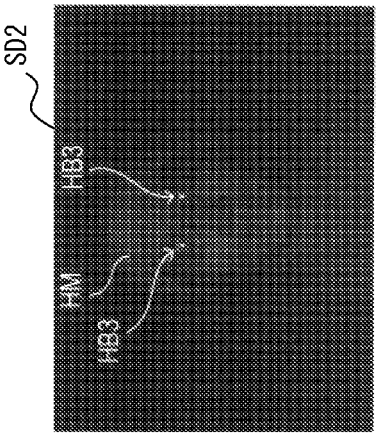
Figure 8G:
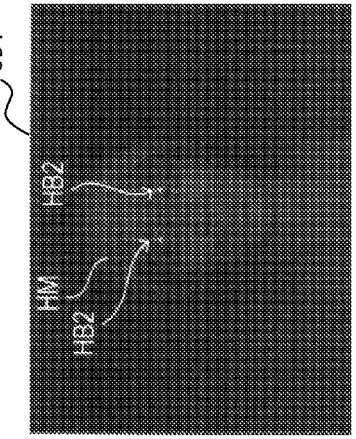
Figure 8L:
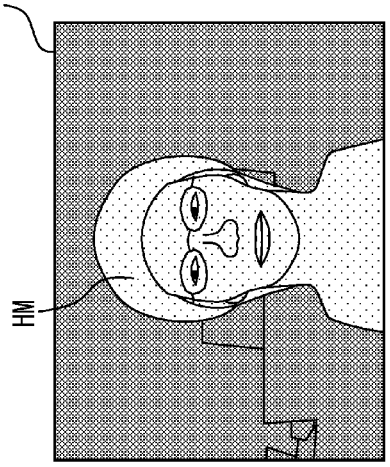
Figure 8J:
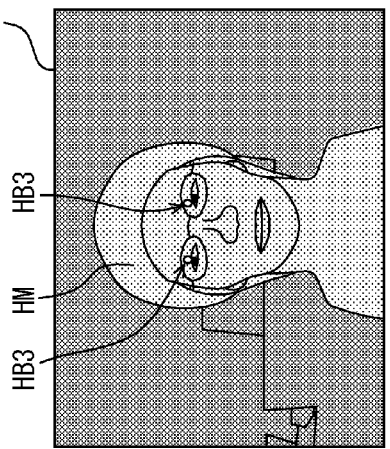
Figure 8H:
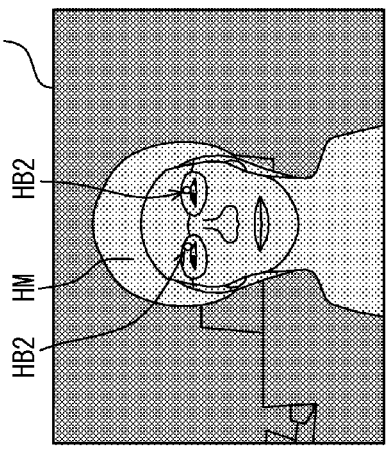

FIG. 8A shows the non-irradiation shot image data CD1 obtained by shooting the face of the human HM, who faces a front side and wears small glasses. FIG. 8B is an illustrative diagram of the non-irradiation shot image data CD1 in FIG. 8A. FIG. 8C shows the first irradiation shot image data CD2, and FIG. 8D is an illustrative diagram of first irradiation shot image data CD2 in FIG. 8C. FIG. 8E shows the second irradiation shot image data CD3, and FIG. 8F is an illustrative diagram of the second irradiation shot image data CD3 in FIG. 8E. FIG. 8G shows the first difference image data SD1, and FIG. 8H is an illustrative diagram of the first difference image data SD1. in FIG. 8G. FIG. 8I shows the second difference image data SD2, and FIG. 8J is an illustrative diagram of the second difference image data SD2 in FIG. 8J. FIG. 8K shows the third difference image data SD4, and FIG. 8L is an illustrative diagram of the third difference image data SD4 in FIG. 8K.

As shown in FIGS. 8A-8L, even when the human HM wears the small glasses, the second and third high brightness portions HB2-HB3 are reproduced in the image of the third difference image data SD4.

Figure 9A:
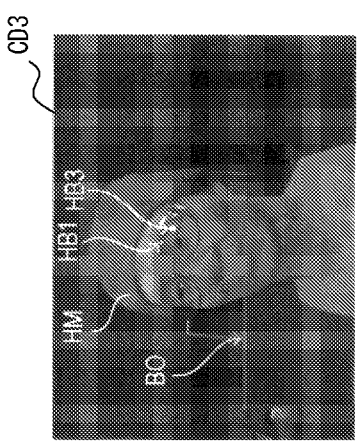
FIGS. 9A, 9C, 9E, 9G, 9I and 9K are photographs showing the face of the human wearing large glasses and facing obliquely.
Figure 9C:
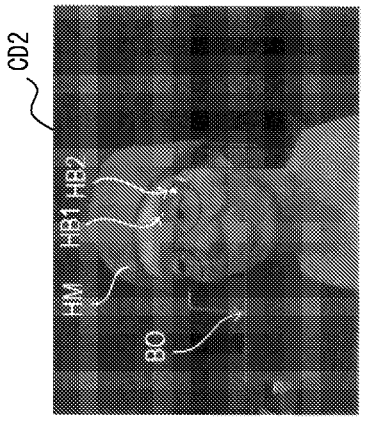
Figure 9E:
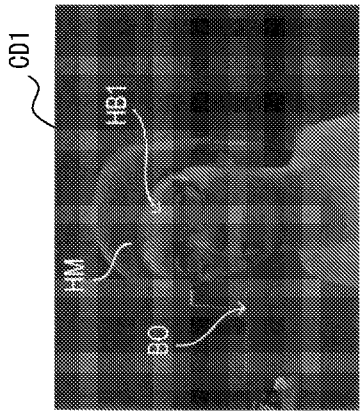
Figure 9B:
FIGS. 9B, 9D, 9F, 9H, 9J and 9L are diagrams corresponding to the photographs in FIGS. 9A, 9C, 9E, 9G, 9I and 9K, respectively.
Figure 9D:
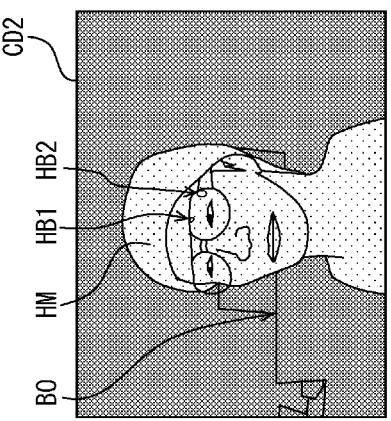
Figure 9F:
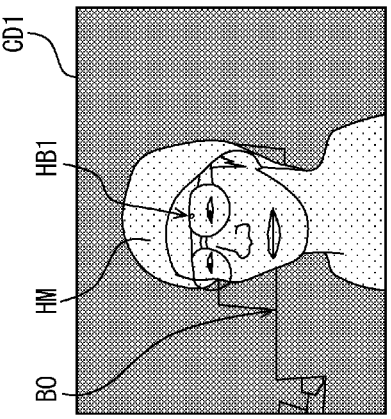
Figure 9G:
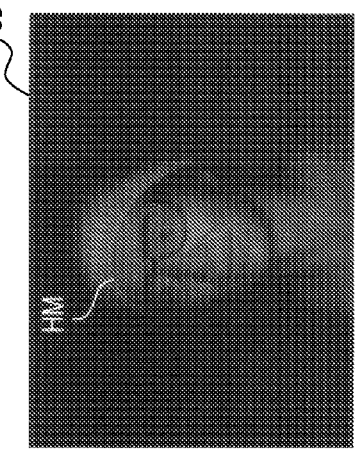
Figure 9I:
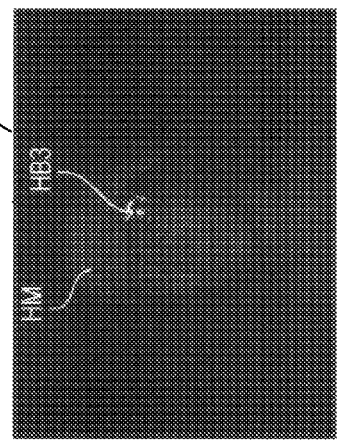
Figure 9K:
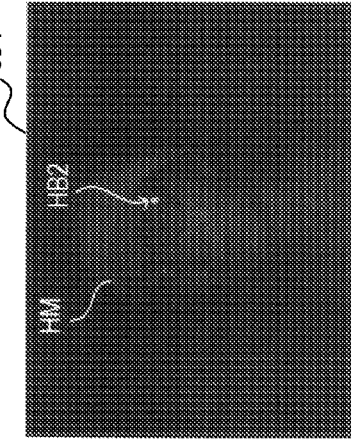
Figure 9H:
Figure 9J:
Figure 9L:

FIG. 9A shows the non-irradiation shot image data CD1 obtained by shooting the face of the human HM, who faces obliquely and wears small glasses. FIG. 9B is an illustrative diagram of the non-irradiation shot image data CD1 in FIG. 9A. FIG. 9C shows the first irradiation shot image data CD2, and FIG. 9D is an illustrative diagram of first irradiation shot image data CD2 in FIG. 9C. FIG. 9E shows the second irradiation shot image data CD3, and FIG. 9F is an illustrative diagram of the second irradiation shot image data CD3 in FIG. 9E. FIG. 9G shows the first difference image data SD1, and FIG. 9H is an illustrative diagram of the first difference image data SD1 in FIG. 9G. FIG. 9I shows the second difference image data SD2, and FIG. 9J is an illustrative diagram of the second difference image data SD2 in FIG. 9J. FIG. 9K shows the third difference image data SD4, and FIG. 9L is an illustrative diagram of the third difference image data SD4 in FIG. 9K.

As shown in FIGS. 9A-9L, even when the human HM faces obliquely and wears the large glasses, the second and third high brightness portions HB2-HB3 are reproduced in the image of the third difference image data SD4.

Figure 10:
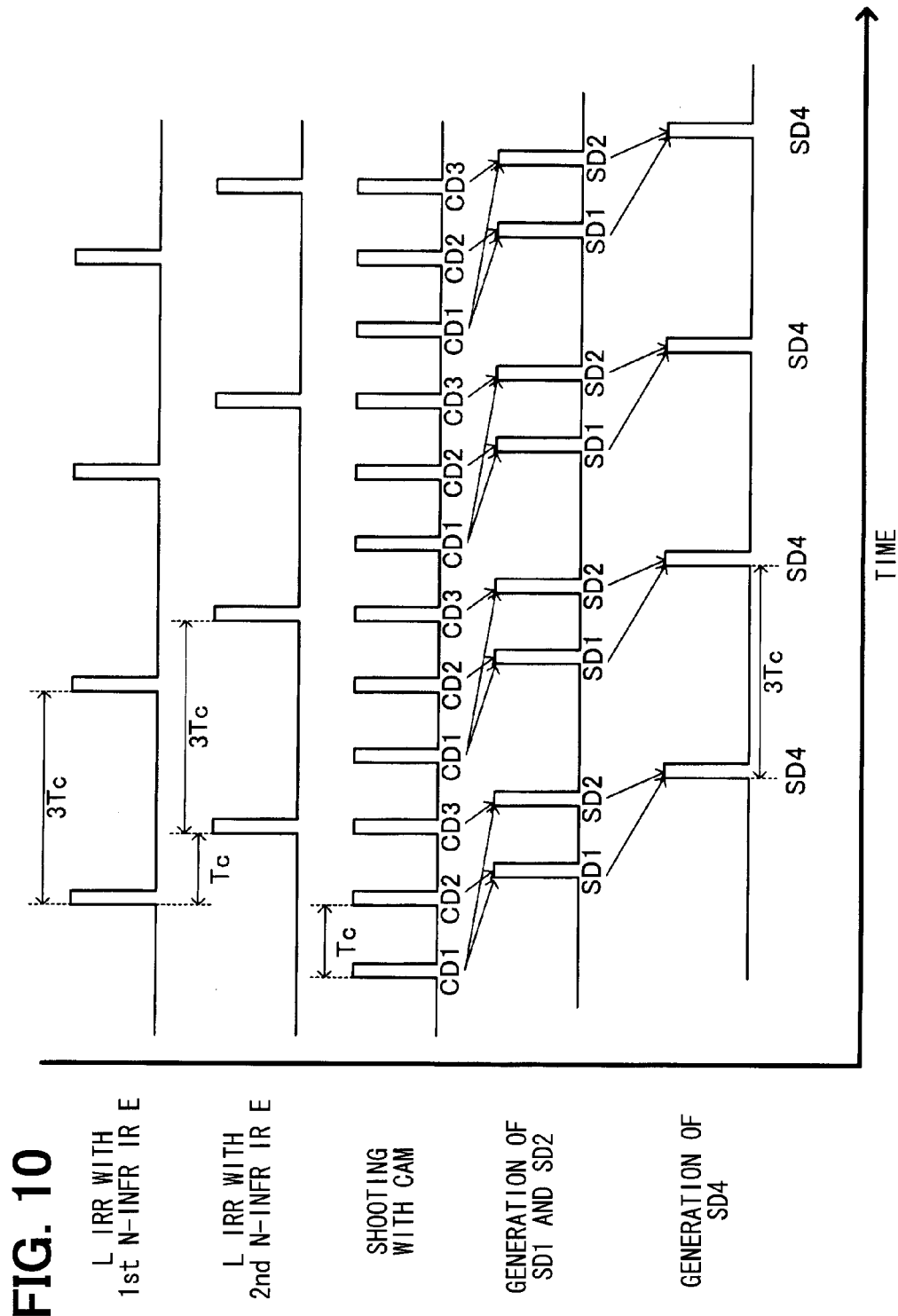
FIG. 10 is a time chart for explaining a method for generating a third difference image data according to a first embodiment.

FIG. 10 shows a time chart for explaining a generating method of the third difference image data SD4.

The camera 2 shoots images of the face of the human HM at every predetermined time intervals Tc. The first near infrared light irradiation element 4 emits the near infrared light at every triplicate time intervals 3Tc of shooting time interval Tc so as to coincide with time at which the camera 2 shoots an image of the face, The second near infrared light irradiation element 5 emits the near infrared light at every triplicate time intervals 3Tc of shooting time interval Tc so as to coincide with time at which the camera 2 shoots an image of the face after the shooting time interval Tc has elapsed from the irradiation of the first near infrared light irradiation element 4.

Accordingly, the image shooting device 1 generates the non-irradiation shot image data CD1, the first irradiation shot image data CD2, and the second irradiation shot image data CD3 at every shooting time interval Tc in this order.

The image shooting device 1 generates the first difference image data SD1 after each one of the first irradiation shot image data CD2 is generated. Further, the image shooting device 1 generates the second difference image data SD2 after each one of the second irradiation shot image data CD3 is generated.

Further, the image shooting device 1 generates the third difference image data SD4 after each one of the second difference image data SD2 is generated. Thus, the image shooting device 1 generates the third difference image data SD4 at every triplicate time intervals 3Tc of shooting time interval Tc.

The camera 2 is disposed at a middle point between the arrangement position of the first near infrared light irradiation element 4 and the arrangement position of the second near infrared light irradiation element 5. Accordingly, compared with a case where the camera 2 is arranged near the arrangement position of the first or second near infrared light irradiation element 4, 5, difference between a first shot image and a second shot image is reduced. Here, the first shot image is defined as an image provided by the first irradiation shot image data CD2, and the second shot image is defined as an image provided by the second irradiation shot image data CD3. Thus, an image of the shooting object in the first shot image is largely overlapped with an image of the shooting object in the second shot image. Accordingly, a portion of the image shot by the camera 2, in which the brightness of the high brightness portion is reproducible, is large.

The image shooting device 1 is mounted on the vehicle, so that the device 1 shoots the face of the driver DR, who drives the vehicle. The reproducibility of the high brightness portion in the image of the face of the driver is high. Accordingly, even if a part of the image corresponding to an eye of the driver has high brightness, the image information of the eye of the driver is reproduced in the image of the face of the driver. Accordingly, detection accuracy of a face orientation and/or a direction of an eye are/is improved.

In the present embodiment, the first near infrared light irradiation element 4 provides a first light emitting element, and the second near infrared light irradiation element 5 provides a second light emitting element. The camera provides a shooting device. The process in Steps S70 and S100 provide a first irradiation control element and procedure. The process in Step S80 provides a first image obtaining element and procedure. The process in Steps S140 and S170 provide a second irradiation control element and procedure. The process in Step S150 provides a second image obtaining element and procedure.

The process in Step S190 provides an image adding element and procedure. The process in Step S200 provides a first image difference element and procedure. The process in Step S210 provides a second image difference element and procedure. The process in Step S30 provides a third image obtaining element and procedure. The first irradiation shot image data CD2 provides a first shot image, and the second irradiation shot image data CD3 provides a second shot image. The addition image data AD1 provides an adding image. The absolute value of difference image data SD3 provides a first difference image, and the third difference image data SD4 provides a second difference image.

(Second Embodiment)

The image shooting device 1 according to a second embodiment executes independently an irradiation and shooting process, a difference image generating process and a reflection light removed image process, instead of the reflection light removing process. The irradiation and shooting process provides to control the irradiation time of the near infrared light and the shooting time of the camera 2. The difference image generating process provides to generate the first difference image data SD1 and the second difference image data SD2. The reflection light removed image process provides to generate an image, from which the influence of the reflection light is removed.

Figure 11:
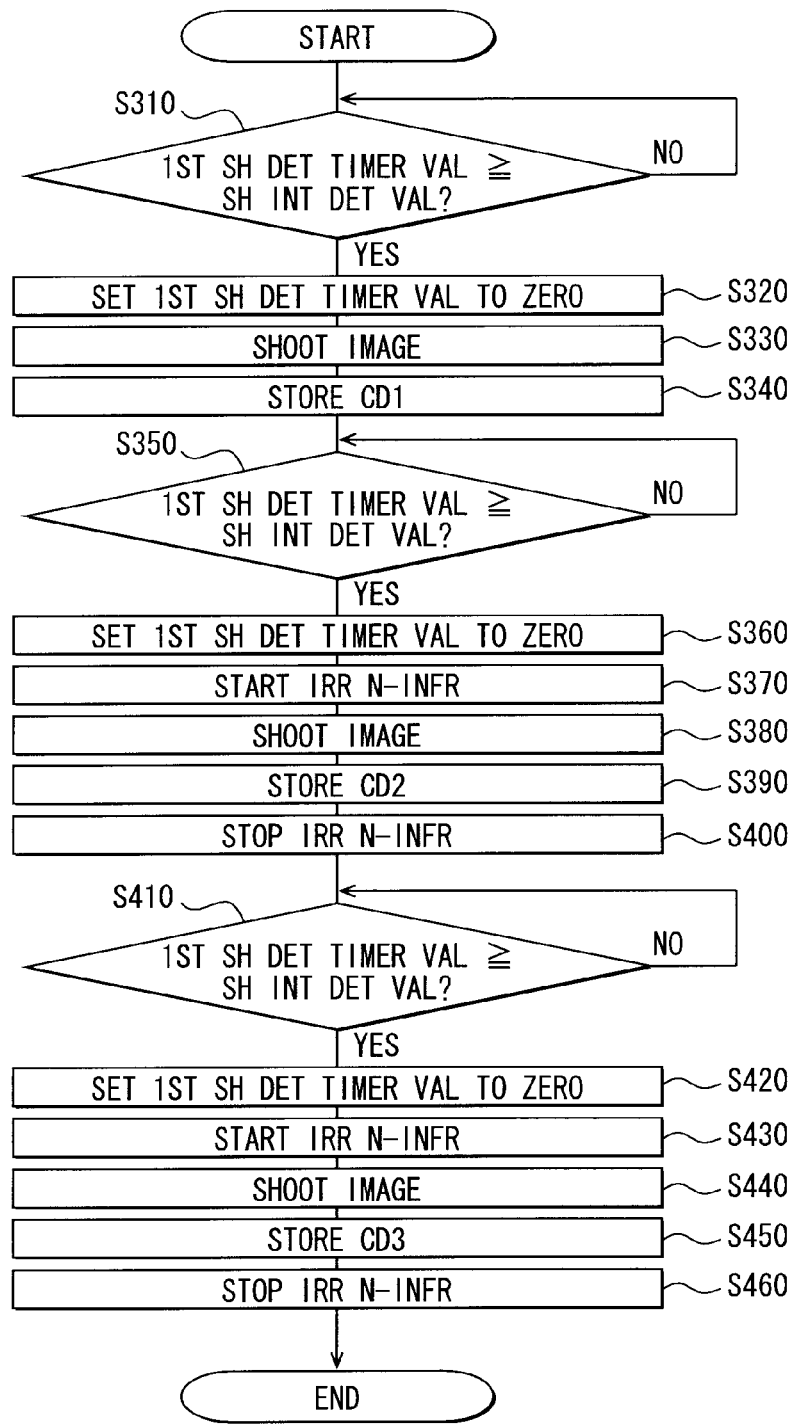
FIG. 11 is a flowchart showing an irradiation and shooting process.

The irradiation and shooting process executed by the controller 6 in the device 1 will be explained with reference to FIG. 11. FIG. 11 is a flowchart of the irradiation and shooting process. The irradiation and shooting process is repeated while the controller 6 turns on, i.e., switches on.

When the irradiation and shooting process is executed, the controller 6 determines in Step S310 whether a first shooting determination timer value is equal to or larger than a predetermined shooting interval determination value.

When the first shooting determination timer value is smaller than the shooting interval determination value, i.e., when the determination in Step S310 is "NO," Step S310 is repeated. When the first shooting determination timer value is equal to or larger than the shooting interval determination value, i.e., when the determination in Step S310 is "YES," in Step S320, the first shooting determination timer value is reset to be zero. Then, in Step S330, an image is shot by the camera 2, and data of the image shot by the camera 2 is generated. The data of the image is defined as a shot image data. The shot image data generated in Step S330 is defined as a non-irradiation shot image data CD1. Then, in Step S340, the non-irradiation shot image data CD1 is stored in the RAM of the controller 6.

Then, in Step S350, the controller 6 determines whether the first shooting determination timer value is equal to or larger than the shooting interval determination value. When the first shooting determination timer value is smaller than the shooting interval determination value, i.e., when the determination in Step S350 is "NO," Step S350 is repeated. When the first shooting determination timer value is equal to or larger than the shooting interval determination value, i.e., when the determination in Step S350 is "YES," in Step S360, the first shooting determination timer value is reset to be zero. Then, in Step S370, the controller 6 controls the first near infrared light irradiation element 4 to start irradiating the near infrared light.

Then, in Step S380, an image is shot by the camera 2, and data of the image shot by the camera 2 is generated. The data of the image is defined as a shot image data. The shot image data generated in Step S380 is defined as a first irradiation shot image data CD2. Then, in Step S390, the first irradiation shot image data CD2 is stored in the RAM of the controller 6. Further, in Step S400, the controller 6 controls the first near infrared light irradiation element 4 to stop irradiating the near infrared light.

Then, in Step S410, the controller 6 determines whether the first shooting determination timer value is equal to or larger than the shooting interval determination value. When the first shooting determination timer value is smaller than the shooting interval determination value, i.e., when the determination in Step S410 is "NO," Step S410 is repeated. When the first shooting determination timer value is equal to or larger than the shooting interval determination value, i.e., when the determination in Step S410 is "YES," in Step S420, the first shooting determination timer value is reset to be zero. Then, in Step S430, the controller 6 controls the second near infrared light irradiation element 5 to start irradiating the near infrared light.

Then, in Step S440, an image is shot by the camera 2, and data of the image shot by the camera 2 is generated. The data of the image is defined as a shot image data. The shot image data generated in Step S440 is defined as a second irradiation shot image data CD3. Then, in Step S450, the second irradiation shot image data CD3 is stored in the RAM of the controller 6. Then, in Step S460, the controller 6 controls the second near infrared light irradiation element 5 to stop irradiating the near infrared light.

Figure 12:
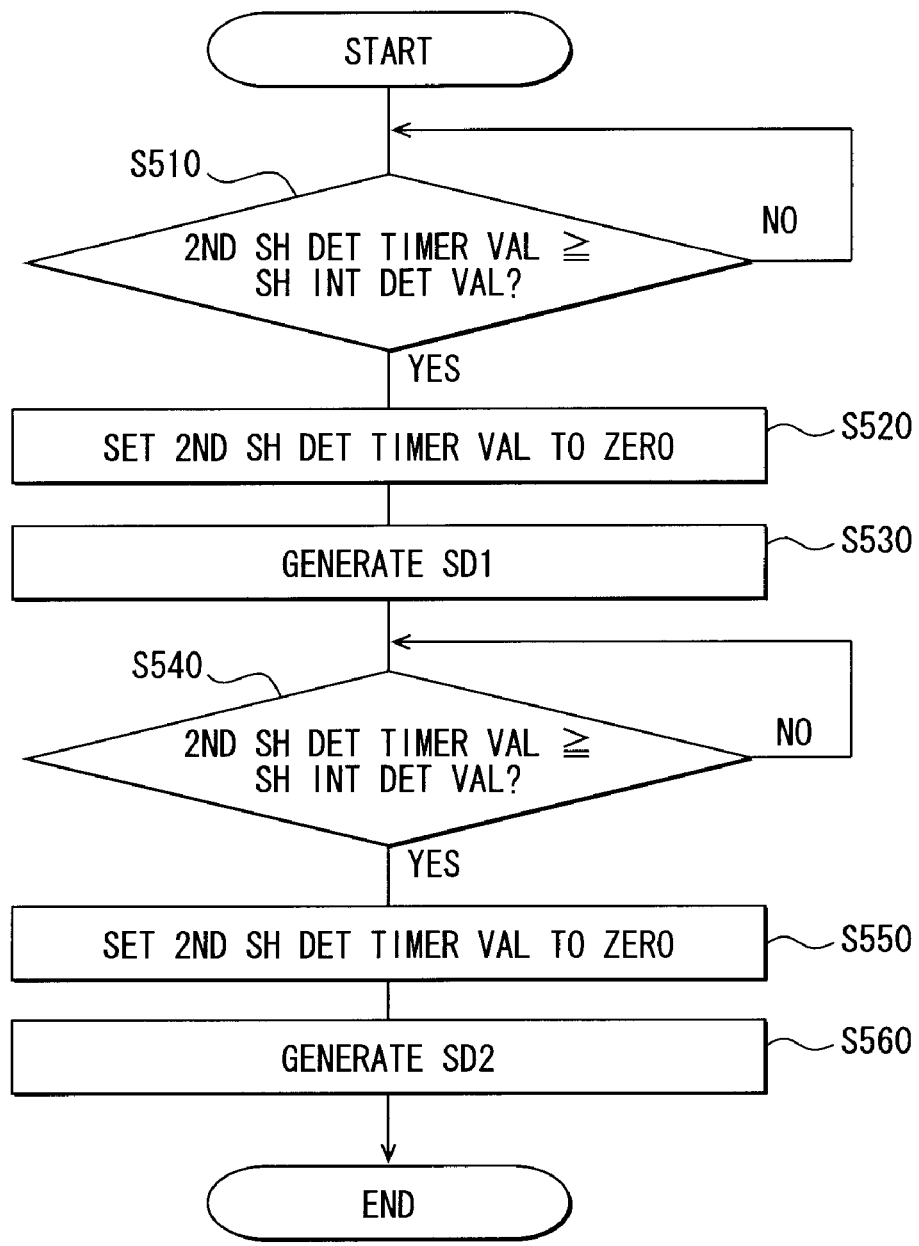
FIG. 12 is a flowchart showing a difference image generating process.

Next, the difference image generating process executed by the controller 6 in the device 1 will be explained with reference to FIG. 12. FIG. 12 is a flowchart of the difference image generating process. The difference image generating process is repeated while the controller 6 turns on, i.e., switches on.

When the difference image generating process is executed, the controller 6 determines whether a second shooting determination timer value is equal to or larger than a predetermined shooting interval determination value. Here, the second shooting determination timer value is set in the second shooting determination timer TM2, which is a timer that increments the value automatically at each period such as one microsecond. When the second shooting determination timer value is reset to be zero at a certain time, the second shooting determination timer TM2 increments the second shooting determination timer value from zero since that time. Further, the second shooting determination timer TM2 starts to increment after a predetermined first delay time has elapsed from a time at which the first shooting determination timer TM1 starts to increment just after the controller 6 is activated.

Here, when the second shooting determination timer value is smaller than the shooting interval determination value, i.e., when the determination in Step S510 is "NO," Step S510 is repeated. When the second shooting determination timer value is equal to or larger than the shooting interval determination value, i.e., when the determination in Step S510 is "YES," in Step S520, the second shooting determination timer value is reset to be zero. Then, in Step S530, difference between brightness of the non-irradiation shot image data CD1 obtained in Step S330 and brightness of the first irradiation shot image data CD2 obtained in Step S380 is calculated so that an image data as a first difference image data SD1 is obtained.

Figure 13:
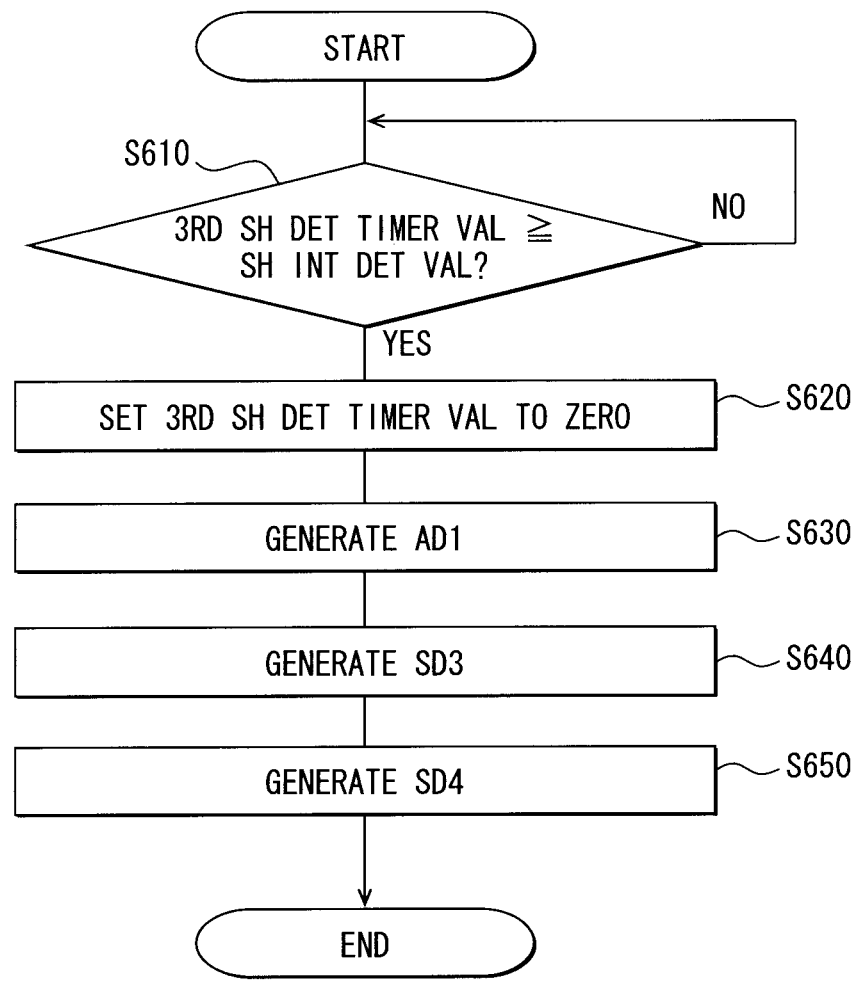
FIG. 13 is a flowchart showing a reflection light removed image process.

Then, in Step S540, the controller 6 determines whether the second shooting determination timer value is equal to or larger than the shooting interval determination value. When the second shooting determination timer value is smaller than the shooting interval determination value, i.e., when the determination in Step S540 is "NO," Step S540 is repeated. When the second shooting determination timer value is equal to or larger than the shooting interval determination value, i.e., when the determination in Step S540 is "YES," in Step S550, the second shooting determination timer value is reset to be zero. Then, in Step S560, difference between brightness of the non-irradiation shot image data CD1 obtained in Step S330 and brightness of the second irradiation shot image data CD3 obtained in Step S440 is calculated so that an image data as a second difference image data SD2 is obtained. Then, the difference image generating process ends, Next, the reflection light removed image process executed by the controller 6 in the device 1 will be explained with reference to FIG. 13. FIG. 13 is a flowchart of the reflection light removed image process. The reflection light removed image process is repeated while the controller 6 turns on, i.e., switches on.

When the reflection light removed image process is executed, the controller 6 determines whether a third shooting determination timer value is equal to or larger than a predetermined shooting interval determination value. Here, the third shooting determination timer value is set in the third shooting determination timer TM3, which is a timer that increments the value automatically at each period such as one microsecond. When the third shooting determination timer value is reset to be zero at a certain time, the third shooting determination timer TM increments the third shooting determination timer value from zero since that time. Further, the third shooting determination timer TM3 starts to increment after a predetermined second delay time has elapsed from a time at which the second shooting determination timer TM2 starts to increment just after the controller 6 is activated.

Here, when the third shooting determination timer value is smaller than the shooting interval determination value, i.e., when the determination in Step S610 is "NO," Step S610 is repeated. When the third shooting determination timer value is equal to or larger than the shooting interval determination value, i.e., when the determination in Step S610 is "YES," in Step S620, the third shooting determination timer value is reset to be zero.

Then, in Step S630, the first difference image data SD1 obtained in Step S530 and the second difference image data SD2 obtained in Step S560 are added to each other so that an addition image data AD1 is obtained. Further, in Step S640, an absolute value of difference between brightness of the first difference image data SD1 obtained in Step S530 and the brightness of the second difference image data SD2 obtained in Step S560 is calculated so that an image data as an absolute value of difference image data SD3 is obtained.

Then, in Step S650, difference between brightness of the addition image data AD1 obtained in Step S630 and the brightness of the absolute value of difference image data SD3 obtained in Step S640 is calculated so that an image data as a third difference image data SD4 is obtained. Thus, the reflection light removed image process ends.

FIG. 14 shows a time chart for explaining a generating method of the third difference image data SD4.

The camera 2 shoots images of the face of the human HM at every predetermined time intervals Tc. The first near infrared light irradiation element 4 emits the near infrared light at every triplicate time intervals 3Tc of shooting time interval Tc so as to coincide with time at which the camera 2 shoots an image of the face. The second near infrared light irradiation element 5 emits the near infrared light at every triplicate time intervals 3Tc of shooting time interval Tc so as to coincide with time at which the camera 2 shoots an image of the face after the shooting time interval Tc has elapsed from the irradiation of the first near infrared light irradiation element 4.

Accordingly, the image shooting device 1 generates the non-irradiation shot image data CD1, the first irradiation shot image data CD2, and the second irradiation shot image data CD3 at every shooting time interval Tc in this order.

The device 1 executes a process for generating the first difference image data SD1 and a process for generating the second difference image data SD2 alternately. The process for generating the first difference image data SD1 is performed with using a latest non-irradiation shot image data CD1 and a latest first irradiation shot image data CD2. The process for generating the second difference image data SD2 is performed with using a latest non-irradiation shot image data CD1 and a latest second irradiation shot image data CD3.

The device 1 generates the third difference image data SD4 with using a latest first difference image data SD1 and a latest second difference image data SD2 after each one of the first difference image data SD1 and the second difference image data SD2 is generated.

Thus, the image shooting device 1 generates the third difference image data SD4 at every shooting time intervals Tc.

In the embodiments, the device 1 shoots the face of the driver. Alternatively, the device 1 may shoot other objects. Specifically, when it is necessary to remove the influence of the reflection light from the object image, the device 1 provides effective results.

Although the device 1 shoots a whole of the face of the driver, the device 1 may shoot a part of the face around the eye of the driver.

In the embodiments, the camera 2 is arranged at a middle point between the arrangement position of the first near infrared light irradiation element 4 and the arrangement position of the second near infrared light irradiation element 5 along with the line connecting between the arrangement position of the first near infrared light irradiation element 4 and the arrangement position of the second near infrared light irradiation element 5. Here, the line is defined as an irradiation element connecting line. Further, the height of the arrangement position of the camera 2 is the same as the height of the arrangement position of each of the first near infrared light irradiation element 4 and the second near infrared light irradiation element 5. Alternatively, the camera 2 may be arranged between the arrangement position of the first near infrared light irradiation element 4 and the arrangement position of the second near infrared light irradiation element 5.

Figure 15B:
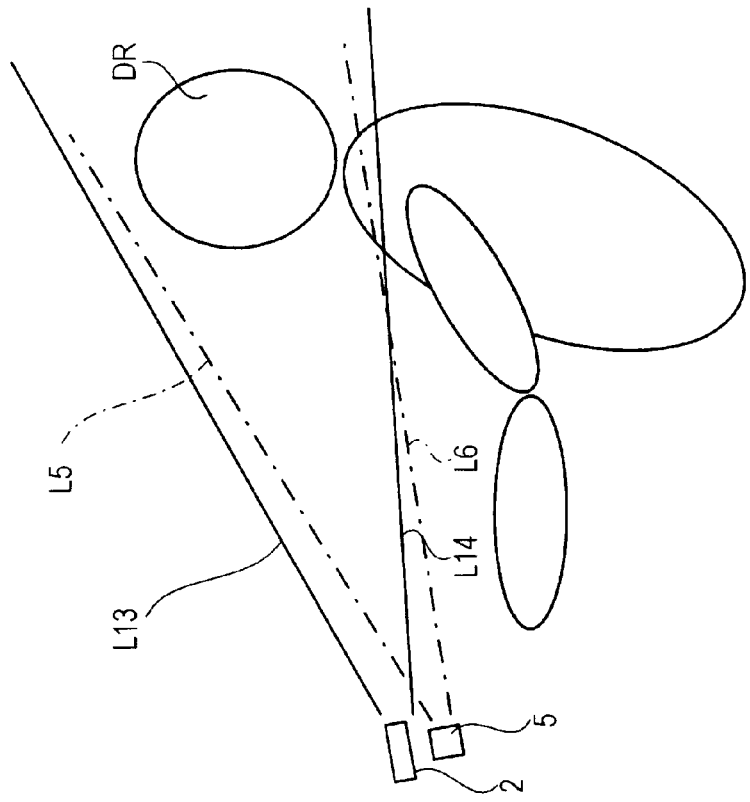
FIG. 15B is a side view showing the shooting range of the camera and the irradiation range of the near infrared light irradiation elements.
Figure 15A:
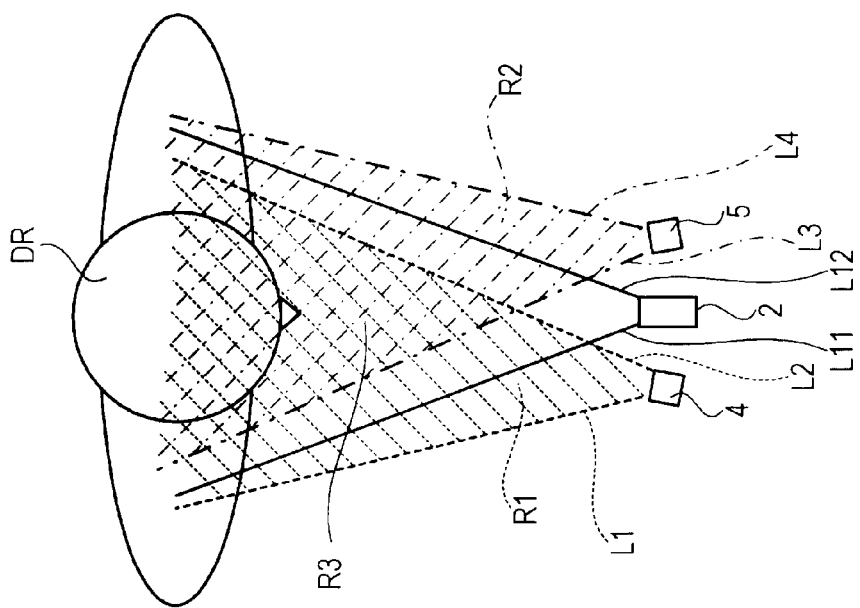
FIG. 15A is a top plan view showing a shooting range of the camera and an irradiation range of the near infrared light irradiation elements according to other embodiments.

For example, as shown in FIGS. 15A and 15B, although the camera 2 is arranged at a middle position between the first near infrared light irradiation element 4 and the second near infrared light irradiation element 5, the height of the arrangement position of the camera 2 is different from the height of the arrangement position of each of the first near infrared light irradiation element 4 and the second near infrared light irradiation element 5.

Alternatively, as shown in FIGS. 16A and 16B, the height of the arrangement position of the first near infrared light irradiation element 4 is different from the height of the arrangement position of the second near infrared light irradiation element 5. The camera 2 is arranged at a middle position between the first near infrared light irradiation element 4 and the second near infrared light irradiation element 5.

The irradiation direction of each of the first near infrared light irradiation element 4 and the second near infrared light irradiation element 5 may be different from the direction shown in FIGS. 3A, 3B, 16A and 16B.

Figure 17A:
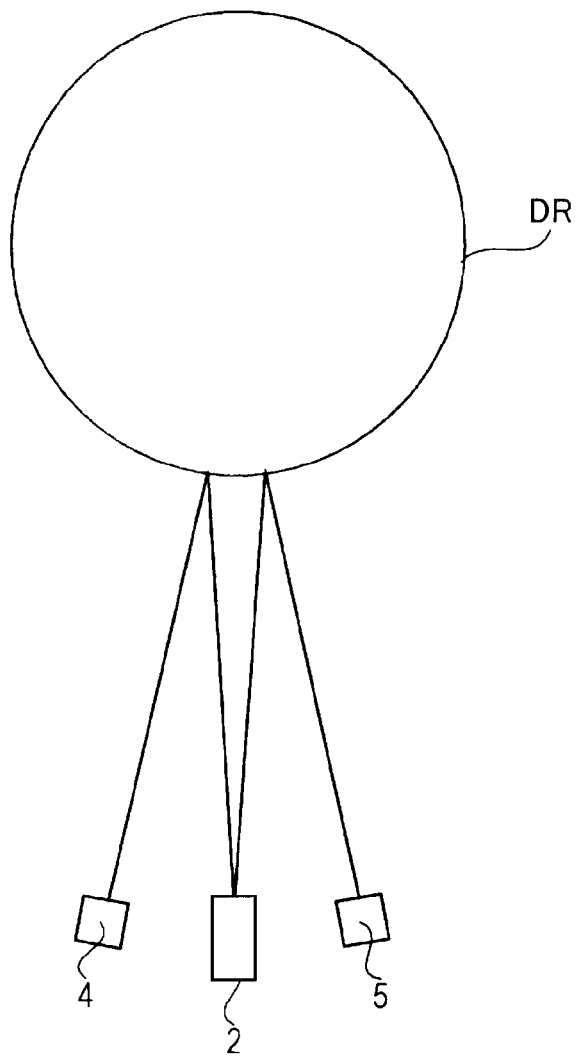
FIG. 17A is a top plan view showing an irradiation direction of the near infrared light irradiation elements according to other embodiments.
Figure 17B:
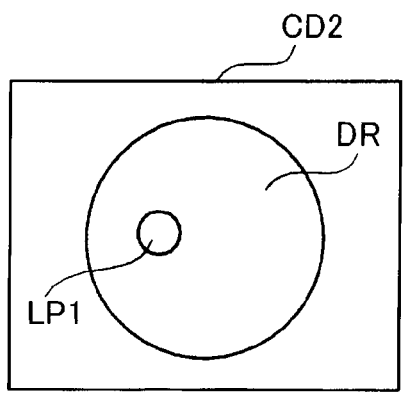
FIGS. 17B and 17C are diagrams showing first and second high brightness reflection positions in images.
Figure 17C:
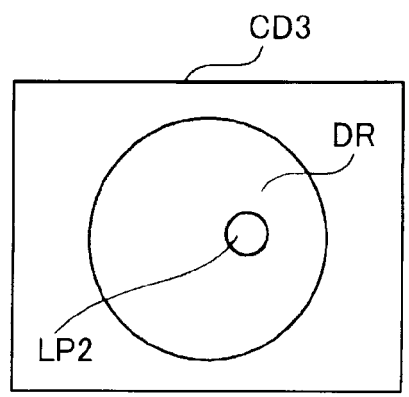

For example, as shown in FIG. 17A, the first near infrared light irradiation element 4 irradiates the near infrared light toward the face of the driver DR along with an irradiation direction, which is different from an irradiation direction of the second near infrared light irradiation element 5. In this case, as shown in FIGS. 17B and 17C, the first high brightness reflection position LP1 in the image of the first irradiation shot image data CD2 is different from the second high brightness reflection position LP2 in the image of the second irradiation shot image data CD3.

Figure 18A:
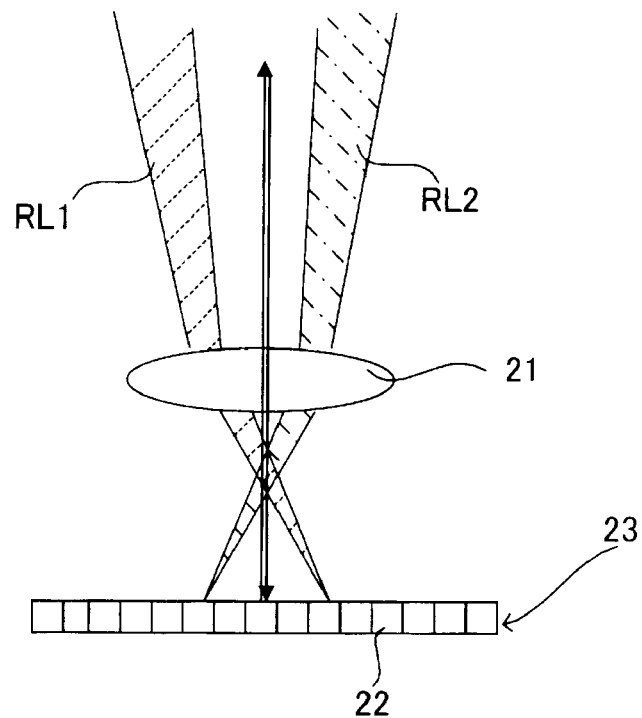
FIGS. 18A and 18B are a top plan view and a side view showing light paths of reflection light.

Alternatively, as shown in FIG. 18A, the camera 2 may includes a lens 21 and an image sensor 23 having multiple solid-state image sensing elements 22. The near infrared light emitted from the first near infrared light irradiation element 4 is reflected on the face of the driver DR, and the near infrared light emitted from the second near infrared light irradiation element 5 is reflected on the face of the driver DR. The reflected light RL1 from the first near infrared light irradiation element 4 and the reflected light RL2 from the second near infrared light irradiation element 5 pass through the lens 21, and then, are concentrated on the image sensor 23. The solid-state image sensing elements 22 are arranged on the image sensor 23 with a two-dimensional lattice pattern.

Figure 18B:
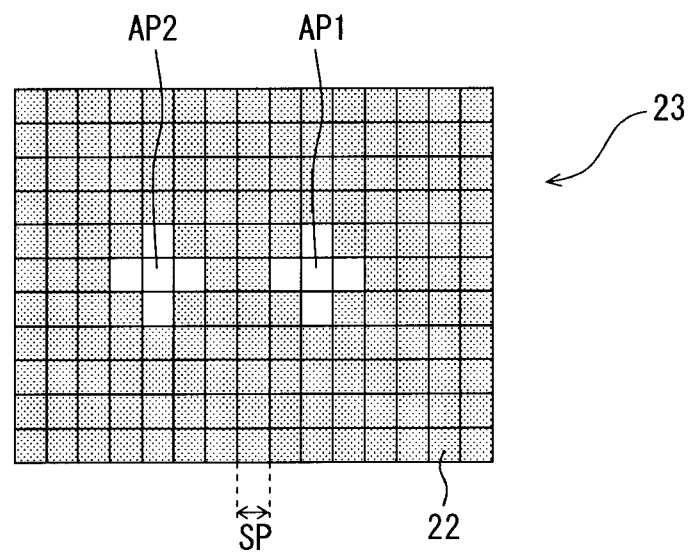

As shown in FIG. 18B, a part of the reflected light RL1 corresponding to the first high brightness reflection position LP1 reaches a first position AP1 on the image sensor 23. A part of the reflected light RL2 corresponding to the second high brightness reflection position LP2 reaches a second position AP2 on the image sensor 23. In this case, it is necessary to set the irradiation direction of each of the first and second near infrared light irradiation elements 4, 5 so as to separate the first and second positions AP1, AP2 from each other by a predetermined distance SP equal to or larger than an arrangement distance of the solid-state image sensing elements 22. This is because the first position AP1 corresponding to the first high brightness reflection position LP1 does not overlap with the second position AP2 corresponding to the second high brightness reflection position LP2.

Specifically, the irradiation direction of each of the first and second near infrared light irradiation elements 4, 5 is set such that the first position AP1 is spaced apart from the second position AP2 by one or more picture cells.

In the embodiments, the third difference image data SD4 is generated with using the formulas F3-F5. Alternatively, the third difference image data SD4 may be generated with using a following formula F6 or F7.

$$Pg(X,Y)=Pa(X,Y)+Pb(X,Y)-|Pa(X,Y)-Pb(X,Y)|-2pn(X,Y) \quad \text{F6}$$

$$Pg(X,Y)=Pc(X,Y)+Pd(X,Y)-|Pa(X,Y)-Pb(X,Y)| \quad \text{F7}$$

Further, in the embodiments, the first difference image data SD1 and the second difference image data SD2 are generated with using the formulas F1-F2. Further, when the first difference image picture cell data Pc (X, Y) is smaller than zero, the first difference image picture cell data Pc (X, Y) is set to be zero. When the second difference image picture cell data Pd (X, Y) is smaller than zero, the second difference image picture cell data Pd (X, Y) is set to be zero. Alternatively, when the light amount of the near infrared light emitted from each of the first and second near infrared light irradiation elements 4, 5 is sufficiently large, the first difference image data SD1 and the second difference image data SD2 may be generated with using following formulas F8 and F9. In this case, the first difference image picture cell data Pc (X, Y) and the second difference image picture cell data Pd (X, Y) are always equal to or larger than zero. Accordingly, it is not necessary to execute a process for setting the first difference image picture cell data Pc (X, Y) to be zero when the first difference image picture cell data Pc (X, Y) is smaller than zero, and a process for setting the second difference image picture cell data Pd (X, Y) to be zero when the second difference image picture cell data Pd (X, Y) is smaller than zero.

$$Pc(X,Y)=|Pa(X,Y)-Pn(X,Y)| \quad \text{F8}$$

$$Pd(X,Y)=|Pb(X,Y)-Pn(X,Y)| \quad \text{F9}$$

Further, in the embodiments, the camera 2 and the first and second near infrared light irradiation elements 4, 5 are arranged near the instrumental panel IP. Alternatively, the camera 2 and the first and second near infrared light irradiation elements 4, 5 may be arranged on different place as long as the camera 2 shoots the face of the driver DR and the first and second near infrared light irradiation elements 4, 5 irradiate the near infrared light toward the face of the driver DR. For example, the camera 2 and the first and second near infrared light irradiation elements 4, 5 may be arranged near a steering column.

The device 1 may further include a display for displaying the image of the third difference image data SD4.

The above disclosure has the following aspects.

According to a first aspect of the present disclosure, an image shooting device for shooting an image of an object includes: a first light irradiation element for irradiating first light; a second light irradiation element for irradiating second light; an image shooting element for shooting an image with received light; and a controller. The first light irradiation element has a first irradiation region, in which the first light from the first light irradiation element passes, and the second light irradiation element has a second irradiation region, in which the second light from the second light irradiation element passes. The first irradiation region is partially overlapped with the second irradiation region. The image shooting element is disposed at a predetermined position so that the image shooting element receives light reflected on the object, the light being one of the first and second light. The object is arranged in an overlapping region of the first and second irradiation regions. The controller controls the image shooting element to shoot a first image of the object when the first light irradiation element irradiates the first light. The controller stores the first image. The controller controls the image shooting element to shoot a second image of the object when the second light irradiation element irradiates the second light. The controller stores the second image.

Here, the above device corresponds to the device according to the first and second embodiment under a condition that the brightness of the non-irradiation image is zero. Specifically, all of the non-irradiation shot image data CD1 in the non-irradiation image are zero.

In the above device, since the first irradiation region is partially overlapped with the second irradiation region, the first irradiation region is not the same as the second irradiation region. Accordingly, a first high brightness portion of the object is different from a second high brightness portion. When the first light irradiation element irradiates the first light toward the object, and the first light reflects on the object at the first high brightness portion so that the brightness of the first high brightness portion becomes high. When the second light irradiation element irradiates the second light toward the object, and the second light reflects on the object at the second high brightness portion so that the brightness of the second high brightness portion becomes high. Thus, the first image in the controller loses image information at the first high brightness portion, and the second image in the controller loses image information at the second high brightness portion. However, the second image in the controller has image information at the first high brightness portion, and the first image in the controller has image information at the second high brightness portion.

Accordingly, with using the first image and the second image, the high brightness portion is detected, and the image information at the high brightness portion is reproduced without using a threshold. Thus, reliability of detection of the high brightness portion is improved. Further, it is not necessary to replace the brightness at the high brightness portion with brightness of a periphery portion. Since the brightness at the high brightness portion is replaced with brightness at the high brightness portion which is actually detected, reproducibility of the brightness at the high brightness portion is improved.

Alternatively, the controller may include a first light irradiation control means, a first image storing means, a second light irradiation control means and a second image storing means. The first light irradiation control means controls the first light irradiation element to irradiate only the first light. The first image storing means controls the image shooting element to shoot the first image only when the first light irradiation element irradiates the first light. The second light irradiation control means controls the second light irradiation element to irradiate only the second light. The second image storing means controls the image shooting element to shoot the second image only when the second light irradiation element irradiates the second light.

Alternatively, the controller may generate an addition image by adding brightness of the first image and brightness of the second image. The controller may generate an absolute difference image by calculating an absolute value of difference between the brightness of the first image and the brightness of the second image. The controller may generate a final difference image by subtracting brightness of the absolute difference image from brightness of the addition image.

In the above case, the first image includes a first high brightness portion with a first high brightness, which is defined as A1, and other portions with a first normal brightness, which is defined as A2. The second image includes a second high brightness portion with a second high brightness, which is defined as B1, and other portions with a second normal brightness, which is defined as B2. Here, the first high brightness A1 is larger than the first normal brightness A2, and the second high brightness B1 is larger than the second normal brightness B2. The first normal brightness A2 is the same as the second normal brightness B2.

In this case, the brightness of the addition image at the first high brightness portion is defined as C1, the brightness of the addition image at the second high brightness portion is defined as C2, and the brightness of the addition image at other portions is defined as C3.

Each brightness C1-C3 is provided by the following formulas F10-F12.

$$C1 = A1 + B2 \qquad \text{F10}$$

$$C2 = A2 + B1 \qquad \text{F11}$$

$$C3 = A2 + B2 \qquad \text{F12}$$

Further, the brightness of the absolute difference image at the first high brightness portion is defined as D1, the brightness of the absolute difference image at the second high brightness portion is defined as D2, and the brightness of the absolute difference image at other portions is defined as D3. Each brightness D1-D3 is provided by the following formulas F13-F15.

$$D1 = |A1 - B2| = A1 - B2 \qquad \text{F13}$$

$$D2 = |A2 - B1| = B1 - A2 \qquad \text{F14}$$

$$D3 = |A2 - B2| = 0 \qquad \text{F15}$$

The brightness of the final difference image at the first high brightness portion is defined as E1, the brightness of the final difference image at the second high brightness portion is defined as E2, and the brightness of the final difference image at the other portions is defined as E3. Each brightness E1-E3 is provided by the following formulas F16-F18.

$$E1 = C1 - D1 = (A1 + B2) - (A1 - B2) = 2 \times B2 \qquad \text{F16}$$

$$E2 = C2 - D2 = (A2 + B1) - (B1 - A2) = 2 \times A2 \qquad \text{F17}$$

$$E3 = C3 - D3 = (A2 + B2) - 0 = A2 + B2 \qquad \text{F18}$$

Thus, the brightness E1 of the final difference image at the first high brightness portion can be replaced with the brightness B2 of the second image at the first high brightness portion. Further, the brightness E2 of the final difference image at the second high brightness portion can be replace with the brightness A2 of the first image at the second high brightness portion.

As a result, the image information of the first image at the first high brightness portion is replaced with the image information of the second image at the first high brightness portion. Further, the image information of the second image at the second high brightness portion is replaced with the image information of the first image at the second high brightness portion. Thus, the brightness of the high brightness portion is reproduced.

Alternatively, the controller may further include an addition image generating means, an absolute difference image generating means and a final difference image generating means. The addition image generating means is configured to generate the addition image. The absolute difference image generating means is configured to generate the absolute difference image. The final difference image generating means is configured to generate the final difference image.

Alternatively, the image shooting element may be arranged at a middle point between the first light irradiation element and the second light irradiation element. In this case, the difference between the first image of the object and the second image of the object is smaller than a case where the image shooting element is disposed near the first light irradiation element or the second light irradiation element. Thus, the overlapping portion of the first image of the object and the second image of the object is large. Thus, the region providing reproduction of the brightness of the high brightness portion becomes wide.

Alternatively, the controller may control the first and second light irradiation elements to irradiate the first and second light alternately, The controller controls the image shooting element to shoot the first image every time the first light irradiation element irradiates the first light. The controller controls the image shooting element to shoot the second image every time the second light irradiation element irradiates the second light. The controller generates the addition image every time the controller generates a latest first image or the controller generates a latest second image. The controller generates the absolute difference image every time the controller generates the latest first image or the controller generates the latest difference image. In this case, the final difference image for providing reproduction of the brightness of the high brightness portion is generated every time the first light irradiation element irradiates the first light or the second light irradiation element irradiates the second light. Further, the controller may generate the final difference image every time the controller generates a latest addition image or the controller generates a latest absolute difference image.

Alternatively, the first and second light may be near infrared light. The controller further includes a non-irradiation image storing means, and the non-irradiation image storing means controls the image shooting element to shoot a non-irradiation image only when no light irradiation element irradiates light. In this case, the non-irradiation image has influence of external light such as sunshine other than the near infrared light. Accordingly, a first difference image between the first image and the non-irradiation image and/or a second difference image between the second image and the non-irradiation image are generated, so that the first or second difference image has small influence of the external light other than the near infrared light.

Alternatively, the image shooting device may be mounted on a vehicle. The object is a head of a driver. The first light irradiation element irradiates the first light toward a face of the driver, and the second light irradiation element irradiates the second light toward the face of the driver. In this case, the high brightness portion of the image of the face of the driver is highly reproduced. Thus, even if the brightness of the eye of the driver in the image of the face of the driver becomes high, the image information of the eye of the driver in the image is reproduced. Thus, the face orientation and the eye direction of the driver are detected with high accuracy.

Alternatively, the first light irradiation element, the second light irradiation element and the image shooting element may be arranged on an instrumental panel or adjacent to a steering column. Here, the instrumental panel and the steering column are disposed in front of the driver seat.

According to a second aspect of the present disclosure, a method for shooting an image of an object includes: irradiating first light; irradiating second light; receiving light and shooting an image with using received light with an image shooting element; controlling the image shooting element to shoot a first image of the object when the first light is irradiated; storing the first image; controlling the image shooting element to shoot a second image of the object when the second light is irradiated; and storing the second image. The first light passes in a first irradiation region, and the second light passes in a second irradiation region. The first irradiation region is partially overlapped with the second irradiation region. The image shooting element is arranged at a predetermined position so that the image shooting element receives light reflected on the object, the light being one of the first and second lights. The object is arranged in an overlapping region of the first and second irradiation regions.

In the above method, with using the first image and the second image, the high brightness portion is detected, and the image information at the high brightness portion is reproduced without using a threshold. Thus, reliability of detection of the high brightness portion is improved. Further, it is not necessary to replace the brightness at the high brightness portion with brightness of a periphery portion. Since the brightness at the high brightness portion is replaced with brightness at the high brightness portion which is actually detected, reproducibility of the brightness at the high brightness portion is improved.

Alternatively, the method may further include: generating an addition image by adding brightness of the first image and brightness of the second image; generating an absolute difference image by calculating an absolute value of difference between the brightness of the first image and the brightness of the second image; and generating a final difference image by subtracting brightness of the absolute difference image from brightness of the addition image.

In the above case, the image information of the first image at the first high brightness portion is replaced with the image information of the second image at the first high brightness portion. Further, the image information of the second image at the second high brightness portion is replaced with the image information of the first image at the second high brightness portion. Thus, the brightness of the high brightness portion is reproduced.

Alternatively, the irradiating the first light may be performed with a first light irradiation element. The irradiating the second light is performed with a second light irradiation element, and the image shooting element is arranged at a middle point between the first light irradiation element and the second light irradiation element.

Alternatively, the irradiating the first light and the irradiating the second light may be performed alternately. The controlling the image shooting element to shoot the first image is performed every time the first light is irradiated. The controlling the image shooting element to shoot the second image is performed every time the second light is irradiated. The generating the addition image is performed every time a latest first image is generated or a latest second image is generated, and the generating the absolute difference image is performed every time the latest first image is generated or the latest second image is generated. Further, the generating the final difference image may be performed every time a latest addition image is generated or a latest absolute difference image is generated.

Alternatively, the method may further include: controlling the image shooting element to shoot a non-irradiation image of the object when no light is irradiated; and storing the non-irradiation image. The first and second light is a near infrared light. The controlling the image shooting element to shoot the non-irradiation image and the storing the non-irradiation image are performed by a non-irradiation image storing means, and the non-irradiation image storing means controls the image shooting element to shoot the non-irradiation image only when no light is irradiated.

Alternatively, the irradiating the first light may be performed by a first light irradiation element, and the irradiating the second light may be performed by a second light irradiation element. The first light irradiation element, the second light irradiation element and the image shooting element are arranged on an instrumental panel or adjacent to a steering column.

According to a third aspect of the present disclosure, an image shooting device for shooting an image of an object includes: a first light irradiation element for irradiating first light; a second light irradiation element for irradiating second light; an image shooting element for shooting an image with received light; and a controller. The first light irradiation element has a first irradiation region, in which the first light from the first light irradiation element passes, and the second light irradiation element has a second irradiation region, in which the second light from the second light irradiation element passes. The first irradiation region is partially overlapped with the second irradiation region. The image shooting element is disposed at a predetermined position so that the image shooting element receives light reflected on the object, the light being one of the first and second light. The object is arranged in an overlapping region of the first and second irradiation regions. The controller controls the image shooting element to shoot a non-irradiation image of the object when no light irradiation element irradiates light. The controller stores the non-irradiation image. The controller controls the image shooting element to shoot a first image of the object when the first light irradiation element irradiates the first light. The controller stores the first image. The controller controls the image shooting element to shoot a second image of the object when the second light irradiation element irradiates the second light, and the controller stores the second image.

In the above device, with using the first image and the second image, the high brightness portion is detected, and the image information at the high brightness portion is reproduced without using a threshold. Thus, reliability of detection of the high brightness portion is improved. Further, it is not necessary to replace the brightness at the high brightness portion with brightness of a periphery portion. Since the brightness at the high brightness portion is replaced with brightness at the high brightness portion which is actually detected, reproducibility of the brightness at the high brightness portion is improved. Further, the non-irradiation image has influence of external light such as sunshine other than the near infrared light. Accordingly, a first difference image between the first image and the non-irradiation image and/or a second difference image between the second image and the non-irradiation image are generated, so that the first or second difference image has small influence of the external light other than the near infrared light.

Alternatively, the controller may generate a first difference image by subtracting brightness of the non-irradiation image from brightness of the first image. The controller generates a second difference image by subtracting the brightness of the non-irradiation image from brightness of the second image. The controller generates an addition image by adding brightness of the first difference image and brightness of the second difference image. The controller generates an absolute difference image by calculating an absolute value of difference between the brightness of the first difference image and the brightness of the second difference image, and the controller generates a third difference image by subtracting brightness of the absolute difference image from brightness of the addition image. Further, the controller may control the first and second light irradiation elements to irradiate the first and second light alternately. The controller may control the image shooting element to shoot the non-irradiation image every time no light irradiation element irradiates light. The controller may control the image shooting element to shoot the first image every time the first light irradiation element irradiates the first light. The controller may control the image shooting element to shoot the second image every time the second light irradiation element irradiates the second light. The controller generates the first difference image every time the controller stores a latest non-irradiation image or the controller stores a latest first image. The controller generates the second difference image every time the controller stores a latest non-irradiation image or the controller stores a latest second image. The controller generates the addition image every time the controller generates a latest first difference image or the controller generates a latest second difference image. The controller generates the absolute difference image every time the controller generates the latest first difference image or the controller generates the latest second difference image. The controller generates the third difference image every time the controller generates a latest addition image or the controller generates a latest absolute difference image.

According to a fourth aspect of the present disclosure, a method for shooting an image of an object includes: irradiating first light; irradiating second light; receiving light and shooting an image with using received light with an image shooting element; controlling the image shooting element to shoot a non-irradiation image of the object when no light is irradiated; storing the non-irradiation image; controlling the image shooting element to shoot a first image of the object when the first light is irradiated; storing the first image; controlling the image shooting element to shoot a second image of the object when the second light is irradiated; and storing the second image. The first light passes in a first irradiation region, and the second light passes in a second irradiation region. The first irradiation region is partially overlapped with the second irradiation region. The image shooting element is arranged at a predetermined position so that the image shooting element receives light reflected on the object, the light being one of the first and second lights. The object is arranged in an overlapping region of the first and second irradiation regions.

In the above method, with using the first image and the second image, the high brightness portion is detected, and the image information at the high brightness portion is reproduced without using a threshold. Thus, reliability of detection of the high brightness portion is improved. Further, it is not necessary to replace the brightness at the high brightness portion with brightness of a periphery portion. Since the brightness at the high brightness portion is replaced with brightness at the high brightness portion which is actually detected, reproducibility of the brightness at the high brightness portion is improved. Further, the non-irradiation image has influence of external light such as sunshine other than the near infrared light. Accordingly, a first difference image between the first image and the non-irradiation image and/or a second difference image between the second image and the non-irradiation image are generated, so that the first or second difference image has small influence of the external light other than the near infrared light.

Alternatively, the method may further include: generating a first difference image by subtracting brightness of the non-irradiation image from brightness of the first image; generating a second difference image by subtracting the brightness of the non-irradiation image from brightness of the second image; generating an addition image by adding brightness of the first difference image and brightness of the second difference image; generating an absolute difference image by calculating an absolute value of difference between the brightness of the first difference image and the brightness of the second difference image; and generating a third difference image by subtracting brightness of the absolute difference image from brightness of the addition image. Further, the irradiating the first light and the irradiating the second light may be performed alternately. The controlling the image shooting element to shoot the non-irradiation image is performed every time no light is irradiated. The controlling the image shooting element to shoot the first image is performed every time the first light is irradiated. The controlling the image shooting element to shoot the second image is performed every time the second light is irradiated. The generating the first difference image is performed every time a latest non-irradiation image is stored or a latest first image is stored. The generating the second difference image is performed every time a latest non-irradiation image is stored or a latest second image is stored. The generating the addition image is performed every time a latest first difference image is generated or a latest second difference image is generated. The generating the absolute difference image is performed every time the latest first difference image is generated or the latest second difference image is generated, and the generating the third difference image is performed every time a latest addition image is generated or a latest absolute difference image is generated.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An image shooting apparatus comprising:
    a first light irradiation device for irradiating near infra-red light;
    a second light irradiation device for irradiating near infra-red light; and
    a shooting device for shooting an image with received light,
    wherein the first light irradiation device and the second light irradiation device irradiate the near infra-red light in such a manner that a first irradiation region, through which the near infra-red light irradiated by the first light irradiation device passes, is partially overlapped with a second irradiation region, through which the near infra-red light irradiated by the second light irradiation device passes; and
    wherein the shooting device is disposed at a predetermined position so that the shooting device receives light reflected on an object, the light provided by the near infra-red light irradiated by the first light irradiation device and the second light irradiation device, and the object arranged in an irradiation overlapping region of the first and second irradiation regions,
    the apparatus further comprising:
    a first light irradiation control device for controlling the first light irradiation device and the second light irradiation device to irradiate the near infra-red light only from the first light irradiation device;
    a first image obtaining device for obtaining the image shot by the shooting device when only the first light irradiation device of the first and second light irradiation devices irradiates the near infra-red light;
    a second light irradiation control device for controlling the first light irradiation device and the second light irradiation device to irradiate the near infra-red light only from the second light irradiation device;
    a second image obtaining device for obtaining the image shot by the shooting device when only the second light irradiation device of the first and second light irradiation devices irradiates the near infra-red light;
    a third image obtaining device for obtaining the image shot by the shooting device when both of the first and second light irradiation devices do not irradiates the near infra-red light;
    a first non-irradiation difference image generation device for generating a first non-irradiation difference image by calculating a difference between brightness of a first shooting image obtained by the first image obtaining device and brightness of a third shooting image obtained by the third image obtaining device;
    a second non-irradiation difference image generation device for generating a second non-irradiation difference image by calculating a difference between brightness of a second shooting image obtained by the second image obtaining device and the brightness of the third shooting image;
    an image addition device for generating an addition image by adding brightness of the first non-irradiation difference image and brightness of the second non-irradiation difference image;
    a first image difference device for generating a first difference image, which shows an absolute value of a difference between the brightness of the first non-irradiation difference image and the brightness of the second non-irradiation difference image; and
    a second image difference device for generating a second difference image by calculating a difference between brightness of the addition image generated by the image addition device and brightness of the first difference image generated by the first image difference device.

2. The image shooting apparatus according to claim 1, wherein the shooting device is arranged at a middle point between an arrangement position of the first light irradiation device and an arrangement position of the second light irradiation device.

3. The image shooting apparatus according to claim 1, wherein the first and second light irradiation control devices control the first and second light irradiation devices to irradiate the near infra-red light alternately;
    wherein the first image obtaining device obtains the first shooting image every time the first light irradiation device irradiates the near infra-red light;
    wherein the second image obtaining device obtains the second shooting image every time the second light irradiation device irradiates the near infra-red light;
    wherein the image addition device generates the addition image with using a latest first shooting image obtained by the first image obtaining device and a latest second shooting image obtained by the second image obtaining device every time at least one of the first and second image obtaining devices obtains an image; and
    wherein the first image difference device generates the first difference image with using the latest first shooting image obtained by the first image obtaining device and the latest second shooting image obtained by the second image obtaining device every time at least one of the first and second image obtaining devices obtains an image.

4. The image shooting apparatus according to claim 1, wherein the image shooting device is mounted on a vehicle;

wherein the object arranged in the irradiation overlapping region is a head of a driver, who drives the vehicle; and wherein the first light irradiation device and the second light irradiation device irradiate the infra-red light toward a face of the driver.

5. The image shooting apparatus according to claim 4, wherein the first light irradiation device, the second light irradiation device and the shooting device are arranged on an instrumental panel or adjacent to a steering column of the vehicle.

6. An image shooting method with using:

a first light irradiation device for irradiating near infra-red light;

a second light irradiation device for irradiating near infra-red light; and a shooting device for shooting an image with received light, wherein the first light irradiation device and the second light irradiation device irradiate the near infra-red light in such a manner that a first irradiation region, through which the near infra-red light irradiated by the first light irradiation device passes, is partially overlapped with a second irradiation region, through which the near infra-red light irradiated by the second light irradiation device passes; and wherein the shooting device is disposed at a predetermined position so that the shooting device receives light reflected on an object, the light provided by the near infra-red light irradiated by the first light irradiation device and the second light irradiation device, and the object arranged in an irradiation overlapping region of the first and second irradiation regions, the method comprising:

a first light irradiation control step for controlling the first light irradiation device and the second light irradiation device to irradiate the near infra-red light only from the first light irradiation device;

a first image obtaining step for obtaining the image shot by the shooting device when only the first light irradiation device of the first and second light irradiation devices irradiates the near infra-red light;

a second light irradiation control step for controlling the first light irradiation device and the second light irradiation device to irradiate the near infra-red light only from the second light irradiation device;

a second image obtaining step for obtaining the image shot by the shooting device when only the second light irradiation device of the first and second light irradiation devices irradiates the near infra-red light;

a third image obtaining step for obtaining the image shot by the shooting device when both of the first and second light irradiation devices do not irradiates the near infra-red light;

a first non-irradiation difference image generation step for generating a first non-irradiation difference image by calculating a difference between brightness of a first shooting image obtained by the first image obtaining step and brightness of a third shooting image obtained by the third image obtaining step;

a second non-irradiation difference image generation step for generating a second non-irradiation difference image by calculating a difference between brightness of a second shooting image obtained by the second image obtaining step and the brightness of the third shooting image;

an image addition step for generating an addition image by adding brightness of the first non-irradiation difference image and brightness of the second non-irradiation difference image;

a first image difference step for generating a first difference image, which shows an absolute value of a difference between the brightness of the first non-irradiation difference image and the brightness of the second non-irradiation difference image; and a second image difference step for generating a second difference image by calculating a difference between brightness of the addition image generated by the image addition step and brightness of the first difference image generated by the first image difference step.

7. The image shooting method according to claim 6, wherein the shooting device is arranged at a middle point between an arrangement position of the first light irradiation device and an arrangement position of the second light irradiation device.

8. The image shooting method according to claim 6, wherein the first and second light irradiation control steps provides to control the first and second light irradiation devices to irradiate the near infra-red light alternately;

wherein the first image obtaining step provides to obtain the first shooting image every time the first light irradiation device irradiates the near infra-red light;

wherein the second image obtaining step provides to obtain the second shooting image every time the second light irradiation device irradiates the near infra-red light;

wherein the image addition step provides to generate the addition image with using a latest first shooting image obtained in the first image obtaining step and a latest second shooting image obtained in the second image obtaining step every time at least one of the first and second image obtaining steps provides to obtain an image; and wherein the first image difference step provides to generate the first difference image with using the latest first shooting image obtained in the first image obtaining step and the latest second shooting image obtained in the second image obtaining step every time at least one of the first and second image obtaining steps provides to obtain an image.

9. The image shooting method according to claim 8, wherein the object arranged in the irradiation overlapping region is a head of a driver, who drives a vehicle; and wherein the first light irradiation device and the second light irradiation device irradiate the infra-red light toward a face of the driver.

10. The image shooting method according to claim 9, wherein the first light irradiation device, the second light irradiation device and the shooting device are arranged on an instrumental panel or adjacent to a steering column of the vehicle.

* * * * *